United States Patent [19]
Datta et al.

[11] Patent Number: 5,153,282
[45] Date of Patent: * Oct. 6, 1992

[54] PREPARATION OF POLYOLEFIN INCORPORATING FUNCTIONAL GROUPS FROM MASKED FUNCTIONAL GROUP-CONTAINING MONOMERS

[75] Inventors: Sudhin Datta, Matawan; Edward N. Kresge, Watchung, both of N.J.

[73] Assignee: Exxon Chemical Patents Inc., Linden, N.J.

[*] Notice: The portion of the term of this patent subsequent to Jan. 22, 2008 has been disclaimed.

[21] Appl. No.: 567,462

[22] Filed: Aug. 14, 1990

Related U.S. Application Data

[63] Continuation of Ser. No. 59,711, Jun. 8, 1987, Pat. No. 4,987,200.

[51] Int. Cl.$^5$ .................. C08F 230/04; C08F 8/12
[52] U.S. Cl. .................. 526/75; 526/169.2; 526/169.3; 526/240; 526/241; 525/326.1; 525/326.6; 525/328.2; 525/328.5; 525/329.5; 525/340; 525/344; 525/355; 525/374; 525/383
[58] Field of Search ............ 526/75, 240, 241, 169.2, 526/169.3; 525/326.6, 328.2, 328.5, 328.9, 329.5, 340, 344, 355, 374, 383, 326.1; 528/487, 490

[56] References Cited

U.S. PATENT DOCUMENTS

| | | | |
|---|---|---|---|
| 2,940,957 | 6/1960 | Herman | 526/241 |
| 3,016,369 | 1/1962 | Montermoso et al. | 526/75 X |
| 3,492,277 | 1/1970 | Clark | 526/75 X |

OTHER PUBLICATIONS

Organic Chemistry, Morrison and Boyd (4th ed.) Allyn and Bacon, Inc., Boston, 436–446 (1983).
Lindsay, Block Copolymerization of Ethylene, Propylene and Acrylic Acid Esters, Block Copolymers Science and Tech., Dale Meier (ed.), Harwood Academic, N.Y., 53–62 (1979).
Matsumura et al., Copolymerization of Propylene With Acrylate By Ziegler–Natta Type Catalyst, J. Polym. Sci., 9, 471–483 (1971).

*Primary Examiner*—Fred Teskin
*Attorney, Agent, or Firm*—W. G. Muller; J. E. Schneider

[57] ABSTRACT

Polymers of olefin monomers and a substantially uniform concentration of carboxyl, hydroxyl, thio, amino, carbonyl and imino functional group-containing monomers. Polymers of olefin monomers and carboxyl, hydroxyl, thio, amino, carbonyl and imino functional group-containing monomers substantially devoid of halogen. Method for preparing polymers by reacting carboxyl, hydroxyl, thio, amino, carbonyl and imino functional group-containing monomers with non-halogenated organometallic compounds to form masked, functional group-containing monomers and polymerizing polymer chain monomers with the masked, functional group-containing monomers to produce a polymer chain. Method for forming masked, functional group-containing monomers by reacting carboxyl, hydroxyl, thio, amino, carbonyl and imino functional group-containing monomers with non-halogenated organometallic compounds. Masked, carboxyl, hydroxyl, thio, amino, carbonyl and imino functional group-containing monomers.

33 Claims, 6 Drawing Sheets

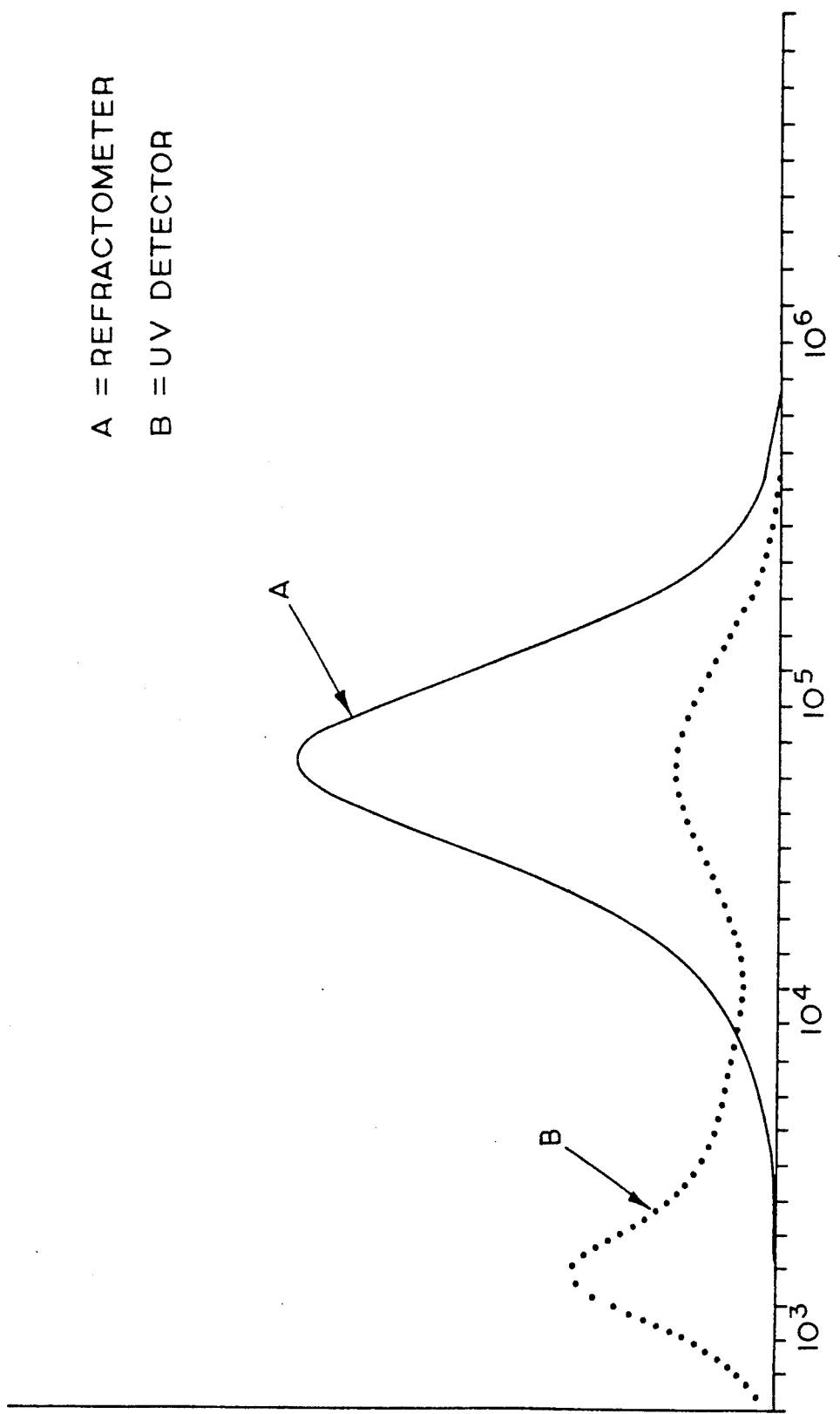

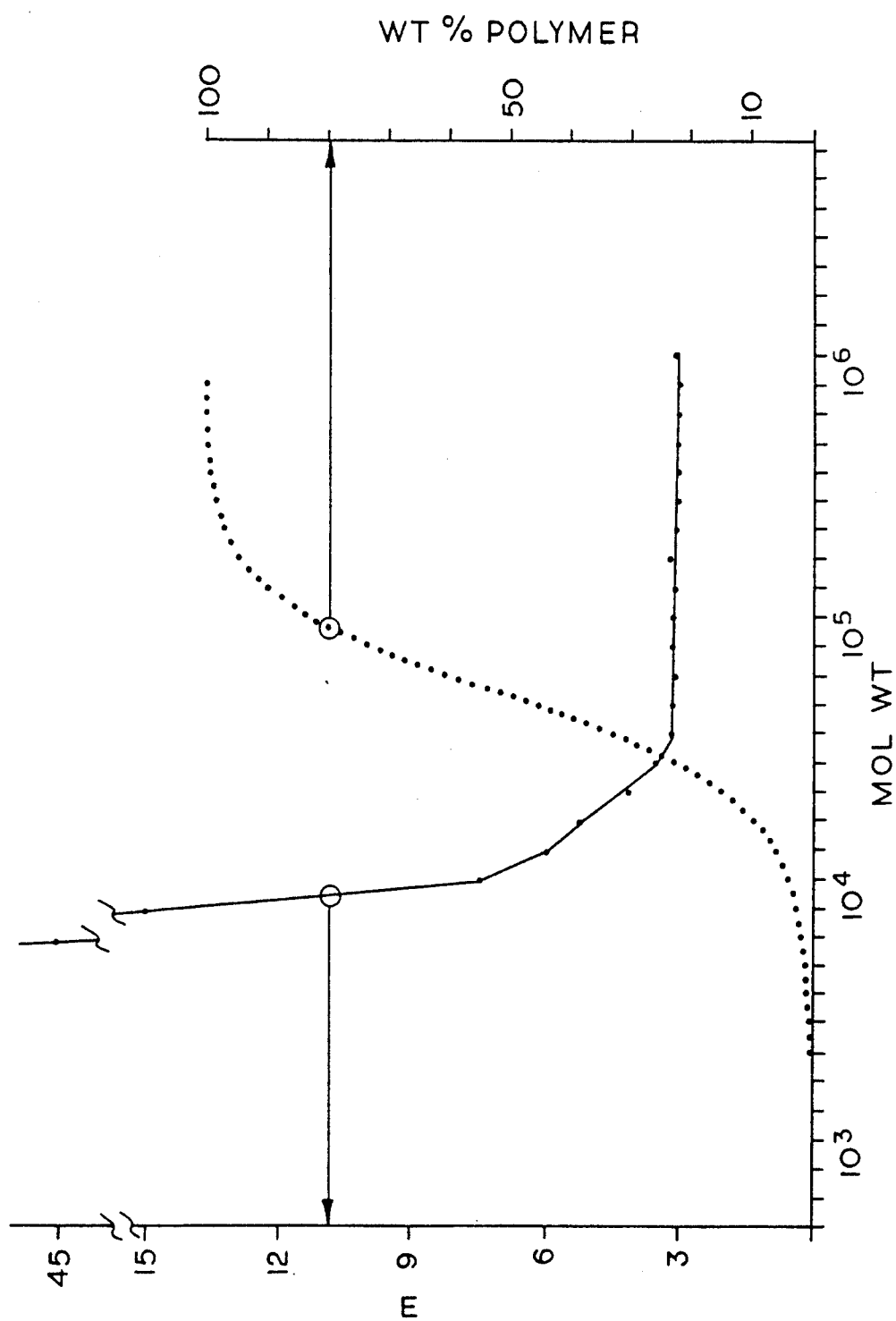
FIG 2 (E vs MOL WT)

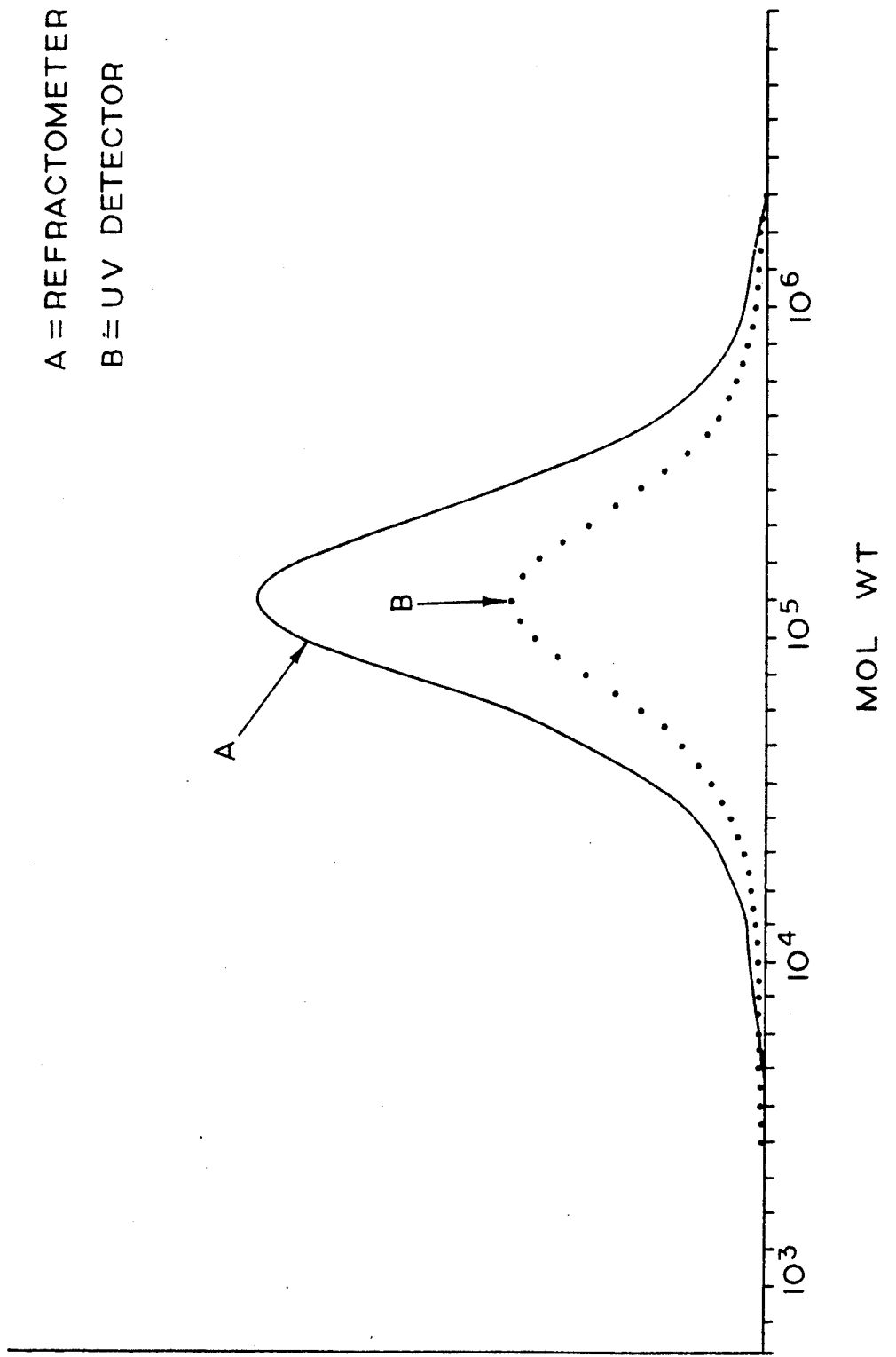

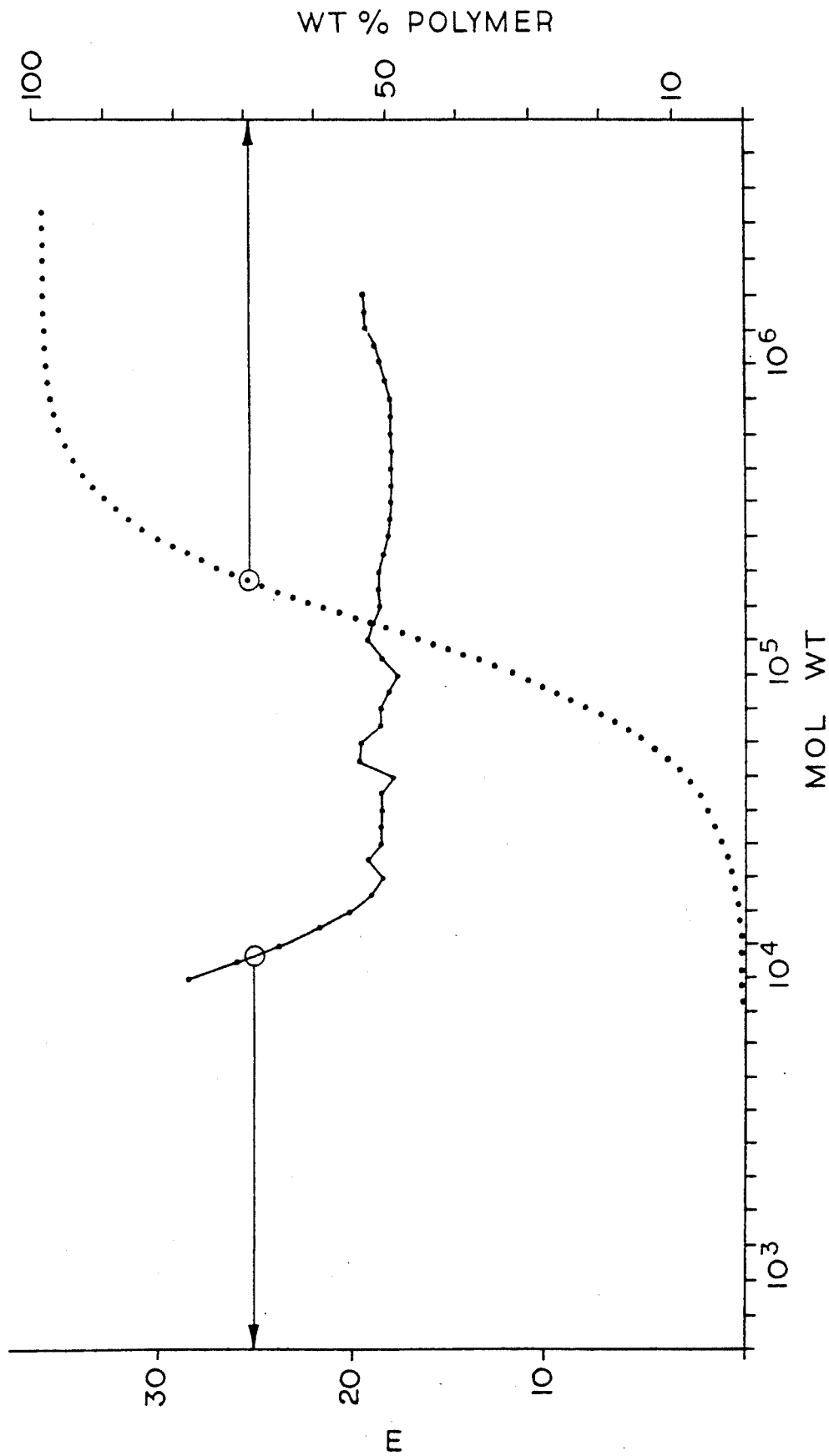
FIG. 4 (E Vs MOL WT)

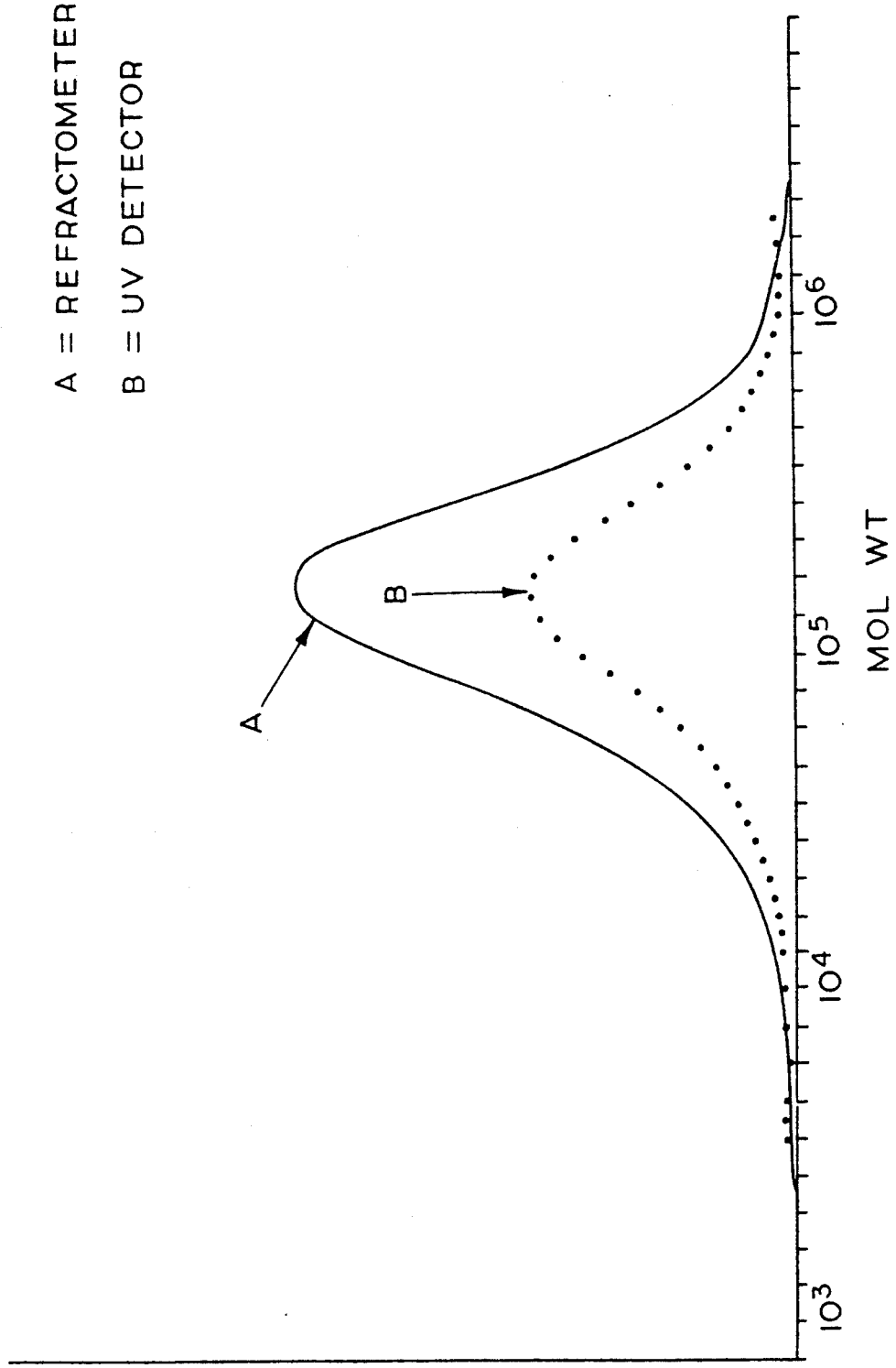

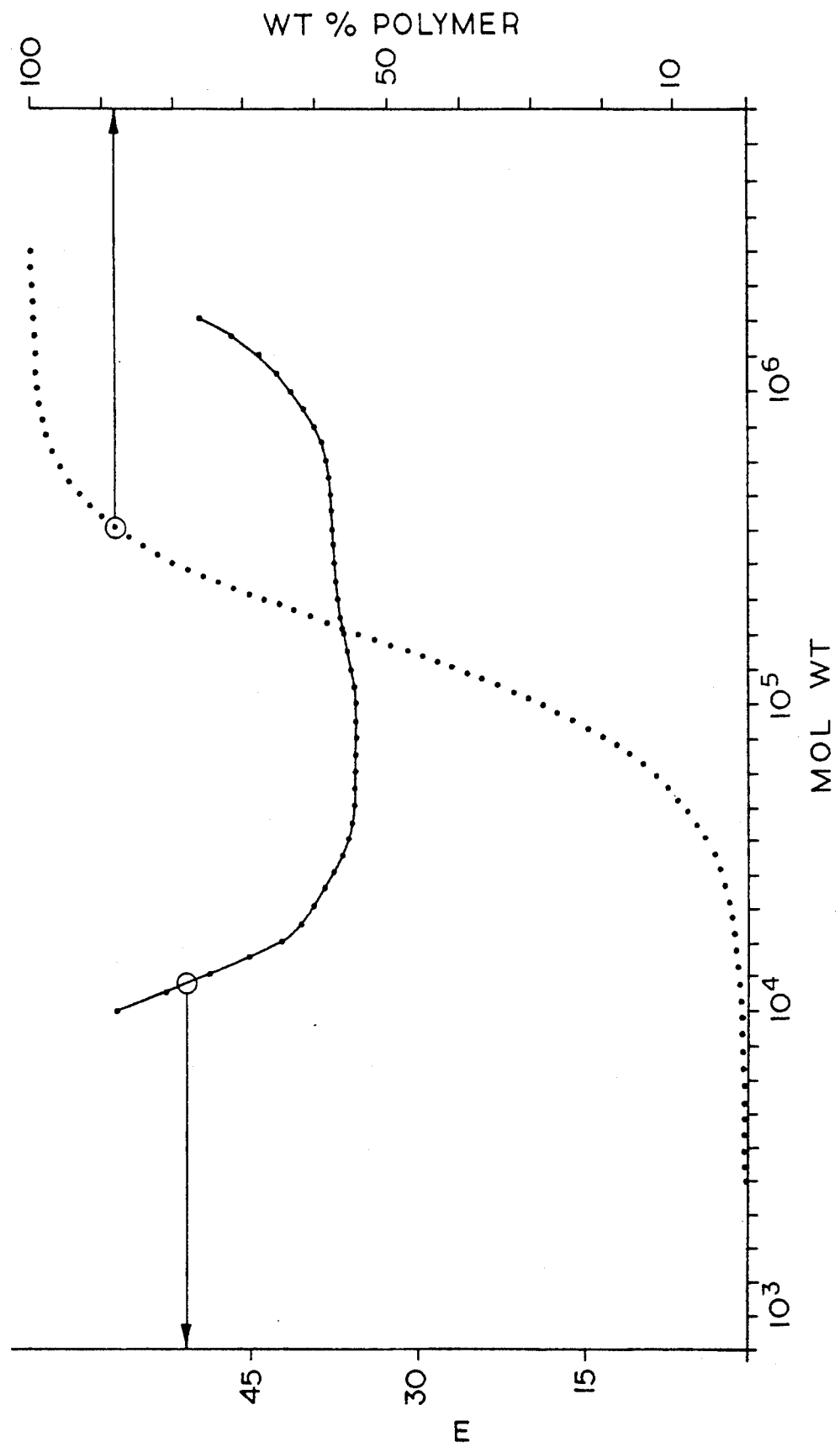

PREPARATION OF POLYOLEFIN INCORPORATING FUNCTIONAL GROUPS FROM MASKED FUNCTIONAL GROUP-CONTAINING MONOMERS

This is a continuation of application Ser. No. 07/059,711, filed Jun, 8, 1987, now U.S. Pat. No. 4,987,200.

BACKGROUND OF THE INVENTION

1. Field of the Invention

The present invention relates to a process for forming a polymer chain of monomers selected from the group consisting of hydrocarbyl radicals and functional group-containing monomers. The hydrocarbyl radicals contain unsaturation capable of polymerization by heterogeneous or homogeneous Ziegler catalysis. The formed polymer chain includes copolymers and terpolymers of ethylene and alpha-olefins formed principally, but not exclusively, by Ziegler polymerization mechanisms. The functional group-containing monomers include olefins with carboxyl, hydroxyl and amine groups. The polymer chain is composed of monomers of hydrocarbyl radicals and such functional group-containing monomers. The present invention also relates to a process for forming masked, functional group-containing monomers, containing monomers, as well as the masked, carboxyl, hydroxyl and amine group-containing monomers. In addition the invention relates to reaction mixtures including monomers selected from the group consisting of hydrocarbyl radicals and members selected from the group consisting of masked, carboxylic acids, alcohols and amine group-containing monomers.

2. Discussion of Background and Material Information

Polymers prepared from alpha-olefins using Ziegler catalysts have found acceptance for use in a wide range of applications including elastomers, fibers and films. Inasmuch as the polymers are essentially nonpolar, however, they have a characteristic inertness which makes them difficult to surface treat, for example, by dyeing or metallizing techniques. Additionally, they are limited in the amount of additives, such as stabilizers and plasticizers which they can accommodate without "blooming". Similar limitations are found in the rubbery copolymers and terpolymers produced from alpha-olefins.

In an attempt to overcome these disadvantages, efforts have been made to introduce polar functional groups into such polyolefins, both homo and copolymers. Previous efforts in this direction have included both the direct incorporation of functionalized monomers during the polymerization process as well as post-polymerization functionalization of polymers.

Post-polymerization techniques for the treatment of olefin polymers to introduce polar groups are well known. For example, the polymer may be oxidized or it may be irradiated with subsequent contacting of the polymer with an unsaturated polar monomer. Similarly, methods of sulfonating the olefin polymers are well known. Among other things, however, these techniques are costly because they require additional treatment and recovery steps after polymerization.

Efforts have been made to incorporate polar monomers directly into the polymer using various techniques. U.S. Pat. No. 3,492,277 discloses a method for forming a complex of a polar monomer containing a labile hydrogen, as in —NH$_2$, —COOH, or —OH, by contacting the polar monomer in an inert hydrocarbon solvent with an organoaluminum compound at a molar ratio of polar monomer to organoaluminum compound of from 1:1 to 1:3, and then heating the solution to between 60° and 150° C. The organic aluminum compounds disclosed have the general formulas AlR$_1$R$_2$R$_3$ or AlR$_1$R$_2$X' wherein R$_1$, R$_2$ and R$_3$ are the same or different alkyl or aryl radicals and X' is either chlorine or bromine. The method disclosed is alleged to be useful with a wide range of monomers including those having polar groups such as —COOR', —CHO, —SH and —SO$_3$H. The polar monomers have the general formula:

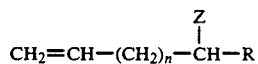

wherein n is an integer greater than 2, R is hydrogen, an alkyl or aryl radical, and Z is the polar moiety. Z can also be an aromatic nucleus bearing such moieties. Although R$_1$, R$_2$ and R$_3$ are generally described as being the same or different aryl or alkyl radicals, this patent does not disclose that non-halogenated organoaluminum compounds affect the results achieved and otherwise disclose and illustrate the procedure by way of examples wherein a halogenated organoaluminum compound is used.

Reaction of the organoaluminum compound with the polar monomer results in a polar monomer reaction product complex, e.g. 5-hydroxy-1-pentene and diethyl aluminum chloride

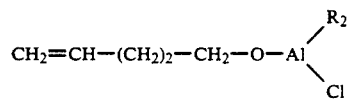

with the elimination of an alkyl or aryl radical from the organoaluminum compound. The complex can then be combined with alpha-olefin and Ziegler catalyst (titanium trichloride) for the polymerization. The polymerization is carried out at about 60° C. to about 100° C. The ratio of the preferred aluminum compound, diethylaluminum chloride, to titanium trichloride is 10:1 to 1:1.

U.S. Pat. No. 4,423,196 discloses a method of incorporating acyclic polar monomers into an alpha-olefin copolymer using an aluminum compound of the formula AlR$_n$X'$_{(3-n)}$ wherein R is a C$_1$–C$_{18}$ alkyl group, X' is halogen and $0 < n \leq 3$. The polar monomer is contacted at room temperature with one mole of organoaluminum compound, and then allowed to react for 1 hour at 70° C. Polymerization is carried out using TiCl$_3$ as the Ziegler catalyst, the ratio of organoaluminum to TiCl$_3$ is 1:1 to 100:1. Polymerization is carried out at about 20° C. to 100° C. and preferably about 60° C. to 90° C. Illustrative of the polar monomers disclosed are eugenol and undec-1-enoic acid. The disclosure of EPO Patent Application No. 0 014 822 is similar in scope, but also discloses ethylene as a compound considered to be an alpha-olefin.

Matsumura, K. and Fukumoto, O., *J. Pol. Sci.*, 9, 471–483 (1971) discloses the copolymerization of propylene using a Ziegler-Natta type catalyst (equimolar quantities of TiCl$_3$ and triethyl aluminum) in the presence of ethylchloroaluminum acrylate, which was formed by the reaction of acrylic acid with diethyl aluminum chloride under $N_2$ at room temperature with cooling.

An article by Spevak, L. L.; Ivanochev, S. S.; et al entitled, "Copolymerization of Ethylene with Acrylic Acid and Its Derivatives Using the Catalyst System $Al(C_2H_5)_2Cl$-$VO(OC_2H_5)_3$" (Sci.-Ind. Enterp. "Plastpolim", Leningrad, USSR), *Plaste Kautsch,* 29(1), 12-15, 1982, discloses the preparation of ethylene/acrylic acid copolymers. An excess of organo aluminum compound is utilized both to complex the acrylic acid and to act as a cocatalyst for the $AlEt_2Cl$-$VO(OEt)_3$ polymerization catalyst system. Complexing of the acrylic acid is accomplished in situ during the polymerization process.

U.S. Pat. No. 3,796,687 discloses the preparation of ethylene-alpha-olefin nonconjugated diene terpolymers using as a fourth monomer a polar compound of the formula: $CH_2=CH-(CH_2)n-Y$ wherein n is an integer from 0 to 20 and Y is a functional group which can be

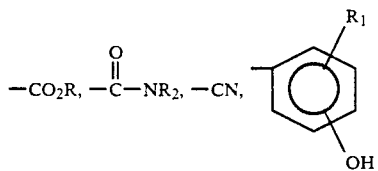

and $-SO_2Cl$ wherein R is H, alkyl, aryl or cycloalkyl containing 1 to 18 carbon atoms and $R_1$ is either R or OR. Other polar compounds disclosed include bridged ring compounds (substituted norbornene) and substituted aromatic compounds. The substituents include those described above as well as alcohols. The polymerization catalyst comprises a vanadium compound and an organoaluminum cocatalyst in conjunction with a halogenated compound (e.g., hexachloropropylene) as catalyst reactivator. The ratio cf aluminum compound to vanadium compound is at least 2:1 preferably 10:1. The polymerization is conducted by dissolving ethylene and a comonomer alpha-olefin in the reaction solvent, the alkylaluminum compound is then added, followed by addition of the unsaturated functional monomer and any diene, then any catalst reactivator, and finally the the vanadium compound.

U.S. Pat. Nos. 3,884,888, 3,901,860, and 4,017,669 are related to U.S. Pat. No. 3,796,687 and have substantially the same disclosures. U.S. Pat. No. 3,884,888 is directed to EPDM which contains as a fourth monomer, a bridged ring compound, e.g., norbornene substituted with a group defined as being $-(CH_2)_n-Z$ where n is 0 to 20 and Z is

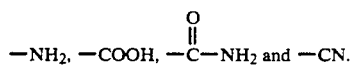

U.S. Pat. No. 3,901,860 is directed toward EPDM Wherein the substituent is similar to that of U.S. Pat. No. 3,884,888 except that Z is COOH. U.S. Pat. No. 4,017,669 claims as the fourth monomer the same bridged ring structure of U.S. Pat. No. 3,884,885 and U.S. Pat. No. 3,901,860 except that the substituent is $-(CH_2)_n-COOR$, wherein n is 0-20 and R can be alkyl, aryl, or cycloalkyl.

Japanese Patent No. JA 7337756-R discloses the copolymerization of an alpha-olefin with an unsaturated carboxylic acid of the formula $CH_2=CH-(CH_2)_n-COOH$. The polymerization catalyst is a halide of Ti or V and an organoaluminum compound. The organoaluminum compound can be of the formula $R_3Al$, $R_2AlX$, $RAlX_2$ $R_2AlOR'$, $RAl(OR')X$ and $R_3Al_2X_3$ where R and R' are alkyl or aryl and X is halogen. The polymerization is effected at 0°-130° C. and 0-50 atmospheres. There is no prereaction of the aluminum compound with the carboxylic acid compound.

U.S. Pat. No. 3,761,458 discloses a process applicable to alpha-olefin containing polar monomers in which the polar groups are separated from the alpha-olefin by two or more carbon atoms. The polar monomer can contain more than one polar group.. The polar group can be one of the amino, cyano, phosphine, (hydrocarb)oxy, metal—metalloid—containing groups, as well as metal salts of acid groups such as $-COOH$, $-SO_3H$, $-PO(OR)OH$, carboxyl groups, or hydrocarbyl sulfide groups. An essential component of the catalyst system is the halide or alkoxyhalide of a transition metal e.g., $TiCl_3$. The preferred cocatalyst is an aluminum alkyl. Other catalysts include vanadium trichloride, zirconium tetrachloride etc. The aluminum compound has the formula $AlR_3$ or $RR'AlX$ wherein R is hydrocarbyl, R' is H or hydrocarbyl and X is halogen, H, alkoxy, aryloxy etc. All monomers and catalyst components are added to the reaction and there is no preference as to order of addition of the monomers. The preferred alkyl groups of the catalyst component is ethyl, but n-propyl, isopropyl, n-butyl, isobutyl, n-octyl or 2-ethyhexyl groups are taught as suitable.

U.S. Pat. No. 4,139,417 discloses amorphous copolymers of mono-olefins or of mono-olefins and nonconjugated dienes with unsaturated derivatives of imides. The polymer comprises about 99.9 to 80 weight percent of non-polar units derived from at least two mono-olefins containing 2 to 18 carbon atoms, particularly ethylene and propylene, and optionally one more non-conjugated diene. In the preparation of the polymer the imide is complexed with a Lewis acid, e.g. alkylaluminum dihalides, aluminum trihalides, boron halides, nickel halides. It is indicated that the Lewis acid-imide complex has a higher stability than that of the reaction products which the non-saturated imide may form with components of the coordination catalyst system used for the copolymerization. The complex between the Lewis acid and the unsaturated imide may be formed before being introduced into the polymerization zone, by dissolving the imide and Lewis acid in an inert solvent maintained at $-80°$ C. to $+80°$ C. Catalyst systems which are disclosed as being particularly suitable for the preparation of the copolymers are formed by the association of an organoaluminum compound with titanium, vanadium, tungsten or zirconium derivatives e.g. halides or oxyhalides. The organoaluminum compound may have the formula

wherein n is 1, 3/2, 2 or 3 and Y is a lower alkyl group, e.g., $C_2$-$C_6$ alkyl, the aluminum compound being associated with a titanium halide, vanadium halide or vanadium oxyhalide.

Japanese Patent Application No. 188996/1982 (Laid Open No. 80413/1984; May 9, 1984) discloses a process for preparing a copolymer of an olefin and a polar vinyl monomer which comprises copolymerizing an olefin with a complex of the polar vinyl monomer and a Lewis acid. The amount of Lewis acid is in excess of an equimolar amount of polar monomer. The Lewis acid is represented by the general formula $R_mMX_n$ wherein R is a hydrocarbyl group; M is B, Al or Sn; X is halogen, and n is greater than zero. Illustrative of the Lewis acid are ethylaluminum dichloride, aluminum chloride, boron trichloride and tin chloride. The polar vinyl monomer is an ester of an unsaturated alcohol and an organic acid. The catalyst component used in the copolymerization process comprises magnesium, titanium, halogen and an electron donor. It is prepared by heating or copulverizing a combination of magnesium or a magnesium compound, a titanium compound and an electron donor.

Japanese Patent Application No. 152767/1982 (Laid Open No. 43003/1984,May 19, 1984) is similar in scope to Japanese Application No. 188997/1982. The catalyst of Japanese Patent Application No. 1532767/1982 however, comprises a reduced titanium tetrachloride with an organoaluminum compound activated by an electron donor such as ether, ester, amine and/or a halogen containing compound. Illustrative of halogen containing compounds are the tetrachlorides of titanium, silicon and tin; hydrogen halide, halogens and halogenated hydrocarbon.

SUMMARY OF THE INVENTION

An object of the present invention is the production of olefin polymers including polymer chain monomers and functional group-containing monomers having a substantially uniform level of functionality among the polymer chains.

A further object of the present invention is the production of olefin polymers including polymer chain monomers and functional group-containing monomers having a low total halogen content, which is preferably less than 10% and more preferably less than 0.03% by weight.

A still further object of the present invention is the monomers and functional group containing monomers which are essentially devoid of organic halides.

Another object of the present invention is to provide a method for forming a polymer chain of polymer chain monomers and functional group-containing monomers which involves reacting a functional group-continuing monomer with a nonhalogenated metallic compound to formed masked, functional group-containing monomers, and polymerizing polymer chain monomers with the masked group containing monomers to produce the polymer chain.

Another further object of the present invention is to provide a method for forming a polymer chain of olefins, referred to herein as polymer chain monomers, and functional group-containing monomers, which involves (a) reacting (i) functional group-containing monomers having a general formula of:

$$R^1\text{---}(X)_n$$

wherein $R_1$ is selected from the group consisting of ethylenically unsaturated hydrocarbyl radicals, n is an integer, and X is selected from the group consisting of carboxyl, hydroxyl, cyano, amino, carbonyl and imino groups with (ii) non-halogenated metallic compounds to form masked, carboxyl, hydroxyl, thio, imino and amino, functional group-containing monomers; and (b) polymerizing polymer chain monomers with the masked, functional group-containing monomers to produce the polymer chain.

The non-halogenated metallic compound used for purpose of the present invention is an organometallic compound of the formula:

$$M\text{---}(Y)_r$$

wherein M is a member selected from Group IIA, IIB, IIIA, IVA, and the transition metal elements and is preferably an element selected from a group consisting of aluminum, magnesium, and zinc, and wherein r is an integer from 1 to 4 is selected so as to satisfy the valence for metal M, and Y is at least one of $R^2$, $R^3$, $R^4$ and $R^5$, wherein $R^2$-$R^5$ are (preferably independently) selected from the group consisting of hydrogen and $C_1$-$C_{16}$ hydrocarbyl, which may or may not contain unsaturation, including $C_1$-$C_{16}$ alkyl, $C_6$-$C_{16}$ aryl, $C_1$-$C_{16}$ alkoxy, provided that at least one of $R^2$-$R^5$ is not hydrogen. Exemplary of preferred $R^2$-$R^5$ groups are members selected from the group consisting of hydrogen, methyl, ethyl, diethyl, propyl, isopropyl, butyl, isobutyl, tertiary butyl, pentyl, and hexyl, and phenyl. Suitable organometallic compounds are diethylzinc, and di-n-hexylmagnesium, with triisobutylaluminum, triethylaluminum, and diisobutyl aluminum hydride being preferred.

BRIEF DESCRIPTION OF DRAWINGS

FIG. 1 is a gel permeation chromatograph of the 3-phenyl- 1-propanol ester of the polymer in Example 20, Case A. The solid curve (A) is the differential refractometer detector trace and the dashed curve (B) is the UV-visible detector trace (at 254 mm).

FIG. 2 is the extinction coefficient of the polymer in FIG. 1 as a function of molecular weight. (The extinction coefficient in the Figures is defined as the ratio of the UV-visible detector value to the differential refractometer value at any particular molecular weight.)

FIG. 3 is a gel permeation chromatograph of the 3-phenyl-1-propanol ester of the polymer in Example 20, Case B. The solid curve (A) is the differential refractometer detector trace and the dashed curve (B) is the UV-visible detector trace (at 254 mm).

FIG. 4 is the extinction coefficient of the polymer in FIG. 3 as a function of molecular weight.

FIG. 5 is a gel permeation chromatograph of the phenyl isocyanate reaction product of the polymer in Example 20, Case C. The solid curve (A) is the differential refractometer detector trace and the dashed curve (B) is the UV-visible detector trace (at 254 mm).

FIG. 6 is the extinction coefficient of the polymer in FIG. 5 as a function of molecular weight.

DETAILED DESCRIPTION OF THE INVENTION

This invention is directed to a process for the direct incorporation of masked, functional group-containing monomers (MFGM) into homopolymers and copolymers, such as polyolefins and particularly ethylene-propylene copolymers (EPM), to form copolymers, terpolymers and tetrapolymers containing the MFGM. The functional group-containing monomer (FGM) is an unsaturated compound which is copolymerizable with polymer chain monomers (PCM), viz. olefins such as ethylene and propylene (described in more detail below), using a Ziegler catalyst. The functional group-containing monomer is masked in a reaction with non-halogenated metallic compounds under controlled conditions and is then contacted with polymer chain monomers for production of the polymer. The functionalized polymers produced in accordance with the present invention are novel and unique in that the polymer chains exhibit generally uniform distribution of functionality, have a low halogen content and are essentially devoid of organic halides.

The functionalized polymers of this invention can be converted into shaped articles by any of the conventional methods already used in the melt-shaping of polyolefins.

Polymer Chain Monomers

The term polymer chain monomer (PCM) as used in the specification and claims includes conventional monomers normally used in the production of polymers. The polymer chain monomers used in the method for forming a polymer in accordance with the present invention are preferably selected from a group consisting of ethylene and $C_3$–$C_{25}$ alpha olefins. The alpha-olefins suitable for use may be branched or straight chained, cyclic, and aromatic substituted or unsubstituted, and are preferably $C_3$–$C_{16}$ alpha-olefins. Mixed olefins can be used (e.g., mixed butenes).

The alpha-olefins, when substituted, should not be aromatic substituted on the 2-carbon position (e.g., moieties such as $CH_2=CH-\phi-$ should not be employed), since such an aromatic group interferes with the subsequent desired polymerization. Illustrative of such substituted alpha-olefins are compounds of the formula $H_2C=CH-C_nH_{2n}-X$ wherein n is an integer from 1 to 20 carbon atoms (preferably to 10 carbon atoms), and X comprises aryl, alkaryl, or cycloalkyl. Exemplary of such X substituents are aryl of 6 to 10 carbon atoms (e.g. phenyl, naphthyl and the like), cycloalkyl of 3 to 12 carbon atoms (e.g. cyclopropyl, cyclobutyl, cyclohexyl, cyclooctyl, cyclodecyl, cyclododecyl, and the like), alkaryl of 7 to 15 carbon atoms (e.g. tolyl, xylyl, ethylphenyl, diethylphenyl, ethylnaphthyl, and the like). Also useful are alpha-olefins substituted by one or more such X substituents wherein the substituent(s) are attached to a non-terminal carbon atom, with the proviso that the carbon atom so substituted is not in the 1- or 2-carbon position in the olefin, in addition to alkyl-substituted bicyclic and bridged alpha-olefins of which $C_1$–$C_9$ alkyl substituted norbornenes are preferred (e.g., 5-methyl-2-norbornene, 5-ethyl-2-norbornene, 5-(2'-ethylhexyl)-2-norbornene, and the like).

Illustrative non-limiting examples of preferred alpha-olefins are propylene, 1-butene, 1-pentene, 1-hexene, 1-octene, and 1-dodecene. The alpha-olefin is generally incorporated into the EPDM polymer in an amount of about 10 to about 90 wt%, more preferably at about 20 to about 70 wt%. The polymer may optionally contain a third type of polymer chain monomer which is an easily polymerizable nonconjugated diene. Non-conjugated dienes suitable for purposes of the present invention can be straight chain, hydrocarbon di-olefins or cycloalkenyl-substituted alkenes, having about 6 to about 15 carbon atoms, for example:

A. straight chain acyclic dienes, such as 1,4-hexadiene and 1,6-octadiene;

B. branched chain acyclic dienes, such as 5-methyl-1,4-hexadiene; 3,7-dimethyl-1,6-octadiene; 3,7-dimethyl-1,7-octadiene; and the mixed isomers of dihydromyricene and dihydro-ocinene;

C. single ring alicyclic dienes, such as 1,3-cyclopentadiene; 1,4-cyclohexadiene; 1,5-cyclo-octadiene and 1,5-cyclododecadiene;

D. multi-ring alicyclic fused and bridged ring dienes, such as tetrahydroindene; methyl-tetrahydroindene; dicyclopentadiene; bicyclo-(2.2.1)-hepta-2,5-diene; alkenyl, alkylidene, cycloalkenyl and cycloalkylidene norbornenes, such as 5-methylene-2-norbornene (MNB), 5-propenyl-2-norbornene, 5-isopropylidene-2-norbornene, 5-(4-cyclo pentenyl)-2-norbornene, 5-cyclohexylidene-2-norbornene, and 5-vinyl-2-norbornene;

E. cycloalkenyl-substituted alkenes, such as allyl cyclohexene, vinyl cyclooctene, allyl cyclodecene, vinyl cyclododecene.

Of the non-conjugated dienes typically used, the preferred dienes are dicyclopentadiene, 1,4-hexadiene, 5-methylene-2-norbornene, and 5-ethylidene-2-norbornene. Particularly preferred diolefins are 5-ethylidene-2norbornene (ENB) and 1,4-hexadiene. The non-conjugated diene is incorporated into the polymer in an amount of from about 0.5 to about 15 wt%; more preferably, from about 1 to about 10 wt%, e.g., 5 wt%.

Functional Group-Containing Monomers

As used in the specification and claims, the term functional group-containing monomer (FGM) means the unsaturated, functionalized monomers of this invention which contain carboxy, hydroxyl, thio, amino, imino, carbonyl, cyano, or other polar functional groups having the general formula:

$$R^1(X)_n$$

wherein $R^1$ is selected from ethylenically unsaturated hydrocarbyl radicals, and X is selected from the group consisting of carboxyl (—C(O)OH), hydroxyl (—OH) and amino (—NHR') groups and carbonyl (—C(O)R'), thio (—SH), cyano (—CN), and imino

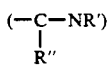

moieties, and wherein n is an integer of at least 1, preferably 1–4, and more preferably 1–2. R' and R" in the above X groups may be the same or different and can comprise H or hydrocarbyl (preferably H or saturated hydrocarbyl), e.g. of 1 to 15 carbon atoms, and preferably alkyl of 1 to 5 carbon atoms, cycloalkyl of from 3 to 7 carbon atoms, and the like. Exemplary of such carboxy groups are —C(O)OH and the like. Exemplary of such amino groups are —NH₂ and alkyl amino groups, e.g., —NHCH₃, —NHC₂H₅, —NHC₃H₇, —NHC₄H₉, and the like. Exemplary of carbonyl groups are —C(O)H, and —C(O)R', such as —C(O)CH₃, —C(O)C₂H₅, —C(O)C₃H₇, —C(O)C₄H₉, and the like. Exemplary of such imino groups are —C=NH, —C=NCH₃, —C=NC₂H₅, —C=NC₃H₇, —C=NC₄H₉, and the like.

The unsaturation in $R^1$ is such that it is easily polymerized by Ziegler catalysts employed in the practice of this invention As used herein $R^1$ preferably contains from 2 to 25 carbon atoms, and preferably from 2 to 16 carbon atoms. In particular, $R^1$ is selected from the group consisting of radicals derived from ethylene, alpha-olefins, homologues of alpha-olefins, norbornene and homologues of norbornene, or from the group consisting of vinyl and allyl radicals. Representative examples of such unsaturation are alpha-olefin types shown as (A) and the unsaturation in the norbornene system shown as (B):

(A) $H_2C=CH-(C_mH_{2m})-$
(B) $R''-(C_pH_{2p})-$ wherein R" comprises norbornyl, m is an integer of from 1 to 30, and p is an integer of from 1 to 30. Preferably m and p are integers of from 0 to 12. More preferably m is 0, 1, or 2, and p is 1, 2, or 3. It will be understood that the $-C_mH_{2m}-$ and $-C_pH_{2p}-$ groups can be branched or straight chained, and that the norbenene ring can be substituted with the $-C_pH_{2p}-$ group at the C-2 or C-7 position, i.e. R" can comprise bicyclo [2.2.1] hept-5-en-2-yl, or bicyclo [2.2.1]-hept-2-en-7-yl, respectively:

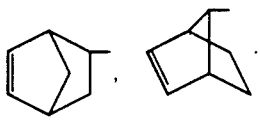

$R^1$ preferably contains from 2 to 25 carbon atoms, and is selected preferably from one of the two classes shown in (A) and (B). Suitable examples from the alpha-olefin unsaturation type includes vinyl, allyl and the higher homologues as represented by integral values of m. Suitable examples of the norbornene unsaturation type include norbornene and its higher homologues represented by integral values for p. More preferably, $R^1$ may contain up to 16 carbon atoms. Preferably, n is the number of functionality sites per FGM and has non-zero integral values between 1 and 5, and more preferably between 1 and 3.

The FGM is preferably soluble in the liquid hydrocarbon solvent or diluent selected for use in the subsequent polymerization reaction (e.g., saturated hydrocarbon solvents, such as hexane).

Exemplary of functional group-containing monomers are members selected from the group consisting of norbornenylcarboxylic acids, norbornenyl-dicarboxylic acids, norbornenyl-methanols, norbornenyl-carboxaldehydes, norbornenyl-methyl amines, norbornenyl-carboximines, vinyl acetic acids and allyl alcohol, and the functional monomers are preferably selected from the group consisting of 5-norbornenyl-2-carboxylic acid, 5-norbornenyl-2,3-dicarboxylic acid, 5-norbornenyl-2-methanol, 5-norbornenyl-2-methylamine, vinyl acetic acid, and allyl alcohol, and mixtures thereof.

The most preferred $R^1-(X)_n$ (or FGM) are the following:

a) 5-norbornene-2-carboxylic acid,
b) 5-norbornene-2,3-dicarboxylic acid,
c) 5-norbornene-2-methanol,
d) 5-norbornene-2-carboxaldehyde,
e) 5-norbornene-2-carboxy-(N-n-butyl) imine,
f) 5-norbornene-2-carboxy-(N-phenyl) imine,
g) vinyl acetic acid,
f) allyl alcohol.

The FGM may also include multiple functionality, that is the $R^1$ moiety may be substituted by more than one "X" group, in which case the functional "X" groups may be the same or different as long as they are selected from the previously identified group of carboxy, hydroxyl, thio, amino, imino, cyano, and carbonyl groups. Exemplary of such multiple functionality FGM's are 5-norbornene-2,3-dicarboxylic acid; 5-norbornene-2,3-dicarboxyaldehyde; 5-norbornene-2,3-di(-carboxy-(N-phenyl)imine); 4-hydroxy-5-methyl carboxy-hex-1-ene; and $CH_3CH(CO_2H)CH-(CO_2H)CH_2CH=CH_2$.

The hydrocarbyl radical in FGM will preferably be norbornyl, or vinyl, in structure with particular preference for norbornyl functionalized at the C-2 position or alpha-olefins functionalized at the C-3 position. Notwithstanding the previously mentioned preferred unsaturated, functionalized monomers, it should be understood that the functional groups may be located at other positions on the hydrocarbyl radical component of the monomer, and it will be further understood that mixtures of such FGM can be employed, if desired.

The functional group monomers useful in this invention may be prepared by conventional methods and detailed description of such FGM preparations is not needed for a complete understanding of this invention. For example, 5-norbornene-2-carboxylic acid can be formed by a Diels Alder addition of cyclopentadiene to acrylic acid, which can be illustrated by the reaction:

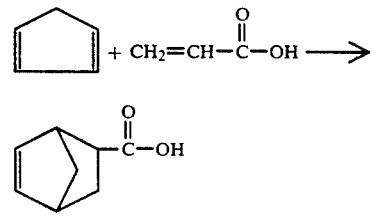

Similarly, 5-norbornene-2-carboxy (N-n-butyl) imine can be formed by a Diels Alder addition of cyclopentadiene to vinyl acrolein, followed by reaction of the resulting 5-norbornene- 2-carboxaldehyde with n-butyl amine:

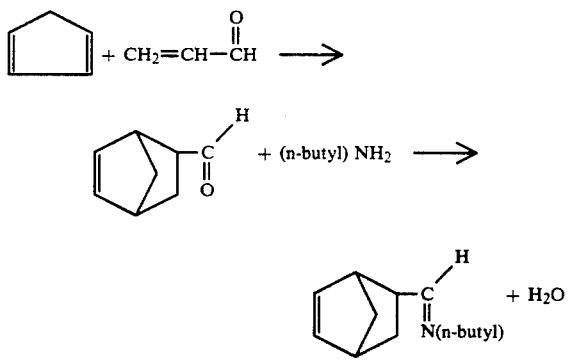

For the incorporation of acid functionality, 5-norbornene-2-carboxylic acid (NBCA) is a preferred monomer because the acid is soluble to some extent in cold water with an increase in solubility experienced at higher temperatures. The solubility for this acid in hexane-water two-phase solvent systems are such that at 50° C. it is hexane layer by washing with two volumes of water in two separate batches. In addition, NBCA is also quite volatile and has a vapor pressure of 20 mm at 138° C. These properties of NBCA facilitate removal of unreacted NBCA following the polymerization, as will be described in more detail below.

Masking Agent

Agents which have been found to be effective in masking functional group-containing monomers for purposes of the present invention include metal alkyls and metal alkyl hydrides and comprise at least one non-halogenated organometallic compound selected from the group consisting of compounds of the formula:

$$M-(Y)_r$$

wherein M is a member selected from Group IIA, IB, IIB, IIIA, IVA, and the transition metals and elements, r is an integer from 1 to 4 and is selected so as to satisfy the valence for metal M, and Y is at least one of $R^2$, $R^3$, $R^4$ and $R^5$, wherein $R^2$-$R^5$ are (preferably independently) selected from the group consisting of hydrogen and $C_1$-$C_{16}$ hydrocarbyl and $C_1$-$C_{16}$ hydrocarbyloxy, which may or may not contain unsaturation, including $C_1$-$C_{16}$ alkyl, $C_6$-$C_{16}$ aryl, $C_1$-$C_{16}$ alkoxy, and $C_6$ to $C_{16}$ aryloxy, provided that at least one of $R^2$-$R^5$ is not hydrogen. Exemplary of preferred $R^2$-$R^5$ groups are members selected from the group consisting of hydrogen, methyl, ethyl, propyl, isopropyl, n-butyl, isobutyl, tertiary butyl, pentyl, hexyl, phenyl tolyl, ethylphenyl, naphthyl, methoxy, ethoxy, propoxy, hexoxy, pentoxy, phenoxy, methylphenoxy, iso-butoxy and tertiary butoxy. Illustrative of M are elements comprising at least one member selected from the group consisting of Be, Mg, Ca, Sr, Ba, La, Ti, Zr, Hf, V, Nb, Ta, Cr, Mo, W, Mn, Re, Cu, Zn, Cd, Hg, Al, Ga, Sn and Pb. Preferred are members selected from the group consisting of Mg, Ca, Ti, Zr, Cu, Zn, Cd, Hg, Al, Ga, Sn and Pb. Most preferred is Al. Suitable organometallic compounds are diethylzinc, and di-n-hexylmagnesium, triethyl aluminum, triisobutyl aluminum, diisobutyl aluminum hydride, tributyl aluminum, tripentyl aluminum, trioctylaluminum, diethyl aluminum hydride, dibutyl aluminum hydride, dihexyl aluminum hydride, trimethyl aluminum, trihexyl aluminum, tridecyl aluminum, tridodecyl aluminum, trihexadecyl aluminum, decyl aluminum dihydride, isobutyl aluminum dihydride, ethyl aluminum dihydride, didecyl magnesium, dipropyl zinc, propyl zinc hydride, diethoxy aluminum hydride, trimethoxy aluminum, sodium alkyls (e.g., $NaCH_3$, $NaC_3H_7$), methyl magnesium hydride, di(isopropyl) magnesium, di (n-hexyl) calcium, dimethyl [bis(cyclopentadienyl)] titanium, with triisobutylaluminum, triethylaluminum, and diisobutyl aluminum hydride being most preferred.

Masked Functional Group-Containing Monomer

The term masked, functional group-containing monomer (MFGM) as used in the specification and claims, is intended to refer to the reaction products formed by the reaction of the functional group-containing monomer and a masking agent comprising at least one non-halogenated metallic organic compound. The masked, functional group-containing monomer so formed is used as the actual comonomer in the polymerization process.

The masked functional group-containing monomers useful for purposes of the present invention have the general formula:

$$R^1-(X(M-Y)_{n'})_n$$

wherein n' is an integer of from 1 to 2, n is an integer of at least 1, preferably 1-4, and more preferably from 1 to 2; $R^1$ is a member selected from the group consisting of ethylenically unsaturated hydrocarbyl radicals as defined above; X is a member selected from the group consisting of carboxyl, hydroxyl, cyano and thio groups, and amino, imino and carbonyl moieties as defined above; M is a member selected from Group IIA, IB, IIB, IIIA, IVA, and transition metal elements; and Y is at least one of $R^2$, $R^3$, $R^4$ and $R^5$, and $R^2$-$R^5$ are independently selected from the group consisting of hydrogen, $C_1$-$C_{16}$ hydrocarbyl, and $C_1$-$C_{16}$ hydrocarbyloxy, which may or may not contain unsaturation, including $C_1$-$C_{16}$ alkyl, $C_6$-$C_{16}$ aryl, $C_1$-$C_{16}$ alkoxy, and $C_6$-$C_{16}$ aryloxy, which preferably are members independently selected from the group of hydrogen, methyl, ethyl, diethyl, propyl, isopropyl, butyl, tertiary butyl, pentyl, hexyl, phenyl, tolyl, ethylphenyl, naphthyl, methoxy, ethoxy, propoxy, hexoxy, pentoxy, phenoxy, methylphenoxy, isobutoxy, and tertiary butoxy. Preferably, M is a metal element selected from the group consisting of aluminum, magnesium and zinc.

Masking Step

An essential feature of the process of the present invention is that the reactive functionality of the functionalized monomers (that is, the X groups discussed above) be protected, i.e. "masked", when these monomers are introduced into the polymerization reactor. Otherwise, an unmasked functionality would tend to react almost immediately with the Ziegler-Natta polymerization catalyst, thereby leading to a loss of activity. The masking reaction provides a chemical deactivation of the reactivity of the functionalized monomer. This deactivation is believed to be both electronic and steric. Although not wishing to be bound by any particular theory, it is believed that deactivation may also involve the temporary replacement of highly reactive groups, such as acidic protons.

The organometallic masking agents are believed to react in one of two possible ways with the functional group-containing to form the masked, functional group-containing mononomer. These pathways include the following representative, but not exclusive examples:

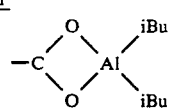

wherein "Bu" is n-butyl, "iBu" is iso-butyl, and "Me" is methyl.

The reaction by Pathway 1 is fundamentally the replacement of an active hydrogen of the FGM functionality by a diakyl aluminum substituent. The reaction is accompanied by loss of a mole of alkane, which in this case is isobutane. The reaction of Pathway 2 is the addition of the elements of the Al—H bond of M—(Y)$_r$ across a polarized heteroatom-carbon double bond (that is, the —C=O, or >C=N bond) of the FGM functionality. In both cases, the final MFGM functionality is for all intents and purposes the same, i.e., a masked functionality of carbonyl, carboxyl, hydroxyl, imino, amino, or thio group. The reaction of $R^1$—(X)$_n$ and M—(Y)$_r$ by either of the pathways indicated above forms masked carbonyl, carboxyl, hydroxyl, thio, imino, and amine functional group-containing monomers having the general formula:

$$R^1-(X(M-Y)_{n'})_n$$

wherein $R^1$, X, M, Y, n' and n are as previously defined herein. The non-halogenated organometallic masking agent and FGM are preferably used in the method of the present invention in a masking agent: FGM molar ratio of 0.6-2.0:1, and most preferably in a molar ratio of about 1:1, for values of n=1. Larger integral values of n imply corresponding factor increases in the FGM to masking agent molar ratios charged to the masking reaction. For example, when the FGM comprises $R^1$—(COOH)$_2$, the masking agent is most preferably used in a molar ratio of 2 moles of masking agent per mole of such di-functional group substituted FGM. Therefore, the masking agent and FGM are preferably contacted in an amount sufficient to provide from about 0.3 to 3, more preferably from about 0.6 to 2, and most preferably from about 0.8 to 1.5 (e.g., from about 0.95 to 1.05) moles of the masking agent per equivalent of the FGM. As used herein, the "equivalents" of the FGM refers to the moles of the FGM multiplied by the number of functional "X" group(s) in the FGM. For example, if a given FGM contains two X groups per molecule, 1 mole of such a FGM is equal to 2 FGM equivalents.

The masking reaction, which can be performed in a batchwise, continuous or semi-continuous manner, is preferably carried out by adding the FGM to the selected metal alkyl masking agent, preferably in the presence of an inert solvent or diluent. It has been observed that the desired MFGM are not formed in acceptable yields when the reverse order of addition is used, that is, when the metal alkyl masking agent is introduced into the selected FGM; rather, such a reverse order of addition tends to form a highly viscous, sludge in the masking reactor. This sludge-like material is believed to be a result of prepolymerization of the FGM by liberation of more than one Y—H (e.g. alkane) derived from a Y group on each metal alkyl per functional group masked, due to the substantial excess of the FGM over the metal alkyl in the masking reaction zone. The masking agent and FGM should be contacted under conditions and for a time effective to form the corresponding MFGM without substantial degradation of the FGM. As used herein, the term "degradation of the FGM" is intended to include side-reactions of the FGM and any component of the masking reaction mixture, such as FGM alkylation, rearrangement and prepolymerization, which decrease the yield of MFGM obtained in contacting the selected FGM and masking agent. Preferably, the selected FGM and masking agent should be contacted at a temperature and for a time sufficient to form the MFGM in essentially quantitative yields, that is, in yields of the MFGM of at least about 95%, more preferably at least about 97%, and most preferably at least about 99%, based on the FGM fed to the masking reactor. The masking reaction should be performed in a reaction zone cooled to maintain the reactants at a temperature of less than 60° C. (e.g., less than about 50° C.), generally less than about 30° C., more generally from about −70° C. to +30° C., e.g. from about −20° C. to +20° C., and most preferably from about −15° C. to +10° C. It has been found that temperatures in excess of about +60° C. results in substantial degradation of the FGM even in the presence of the non-halogenated masking agents of this invention. The pressure employed in the masking reactor is not critical and any convenient pressure can be employed e.g., from about 0.05 to 20,000 kPa. Generally, the FGM and masking agent will be contacted for the masking reaction for a time of from about 0.001 to 10 hours, preferably from about 0.2 to 3 hours.

The masking reaction should be conducted in the substantial absence of molecular oxygen and water, to avoid the deleterious effects which $O_2$ and $H_2O$ have upon the metal alkyl and the MFGM thus formed. Preferably, the masking reaction mixture (and the FGM, masking agent and solvent charged thereto) will contain <20 ppm $H_2O$, more preferably <10 ppm $H_2O$, and preferably <20 ppm $O_2$, more preferably <10 ppm $O_2$, by weight of the total reaction mixture. Most preferably the masking reaction mixture (and hence the materials charged thereto) will contain <5 ppm $O_2$, and <5 ppm $H_2O$ (by weight of the total reaction mixture). Preferably, reactive halides will also be substantially absent in the reactor, e.g., <10 ppm by weight reactive halide (expressed as the halide, e.g., Cl), based on the weight of the total reaction mixture. As used herein, the term "reactive halide" is intended to refer to free halogen (e.g., $Cl_2$), metal halides (e.g., dialkyl aluminum chloride, boron trichloride, tin tetrachloride and the like) or halogen-containing compounds (e.g., t-butyl chloride and the like) that will form metal halide under conditions of the masking reaction. Preferably the MFGM formed by the masking process of this invention are substantially free of halide, and contain less than about 0.01 wt%, more preferably less than about 10 ppm by weight, of total halide.

In the event the selected FGM was prepared by a process herein $H_2O$ is formed as a by-product (e.g., as in the formation of 5-norbornene-2-carboxy (N-n-butyl) imine, as described above), or is otherwise present, the FGM should be treated to remove $H_2O$ to a level of <20 ppm, preferably <10 ppm, more preferably <5 ppm $H_2O$ (based on the weight of the FGM). Such water removal can be accomplished by a variety of methods, such as by cooling the FGM to a temperature sufficient (e.g. <0° C.) to freeze the water out of the liquid FGM. Alternatively, the FGM liquid can be contacted with an amount of molecular sieve (e.g. 3 Angstrom mol sieve) and for a time and under conditions sufficient to remove the desired amount of water. While the precise amount of mol. sieve will vary depending on its water absorption capacity, the amount of water to be removed and other factors, generally a contact time of from 1 min. to 1 hour at temperatures of 0° to +50° C., employing from 1 to 500 gms. of FGM per gram of 3 Angstrom mol. sieve will be sufficient to decrease the $H_2O$ level to <20 ppm for a FGM liquid containing about 10 wt% $H_2O$. The FGM feed can also be treated for water removal by the addition of water soluble inorganic salts (such as NaCl, $CaCl_2$, and the like) to form two liquid phases: the lower phase containing the salts and water; and the upper phase containing the dehydrated FGM, which can then be recovered by conventional liquid-liquid phase separation techniques.

The masking reaction may be conveniently carried out under an inert gas (such as $N_2$, Ar, He), to exclude the presence of air in the masking reaction zone.

Any solvent useful for the polymerization of the MFGM and the PCM (as discussed below) can be employed in the masking reaction. For example, suitable solvents include hydrocarbon solvents such as aliphatics, cycloalphatics, and aromatic hydrocarbon solvents, or halogenated versions of such solvents. Preferred are $C_{12}$ or lower straight-chain or branched-chain, saturated hydrocarbons, and $C_5$ to $C_9$ saturated alicyclic or aromatic hydrocarbons, or $C_2$ to $C_6$ halogenated hydrocarbons. Examples of such solvents are hexane, butane, pentane, heptane, cyclopentane, cyclohexane, cycloheptane, methyl cyclopentane, methyl cyclohexane, isooctane, benzene, toluene, xylene, chloroform, chlorobenzene, tetrachloroethylene, dichloroethane and trichloroethane.

The concentrations of the FGM and masking agent in the selected reaction solvent or diluent are not critical and will typically be selected to facilitate ease of handling of the reactants and reaction mixture and the cooling thereof to remove, and control, the heat of reaction. Typically, the FGM will be employed in a concentration of from about 2 to 70 wt%, and the masking agent in an amount of from about 1 to 40 wt%, based on the total reaction mixture.

It will generally not be necessary to remove any unreacted masking agent from the FGM-masking reaction zone, nor to remove any by-product Y-H from this reaction zone.

The product mixture produced in the masking reaction, containing the MFGM, desirably should be maintained at a temperature of less than 60° C., (e.g., less than about 50° C.), preferably less than about +30° C., preferably from about −70° C. to +30° C., and more preferably from about −20° C. to +20° C., until the MFGM is contacted for polymerization with the polymer chain monomer in the polymerization reaction zone, as will be described in more detail below.

As indicated above, the MFGM formed will have one or two —M—Y groups per functionality, and the value of n' will depend on the functionality to be masked and the masking agent employed. For example, cyano functionalities will require two —M—Y groups per cyano group when M is a trivalent, divalent or monovalent metal or element as described above. Preferably, the MFGM comprises a complex of the formula:

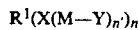

wherein $R^1$, X, M, Y, n' are as defined above.

The masking reactions of this invention can be illustrated in the following reaction equations:

Masking Reactions for Carboxylic Groups

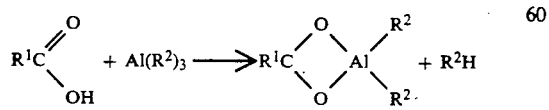

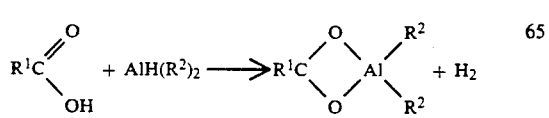

-continued

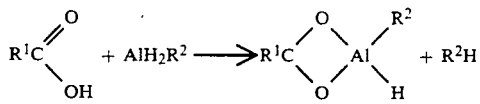

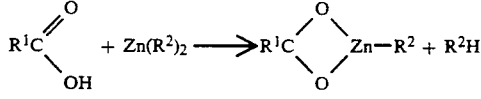

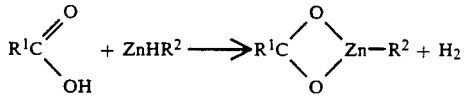

Masking Reactions for Aldehyde Groups

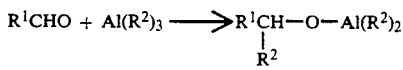

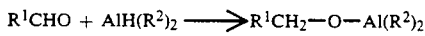

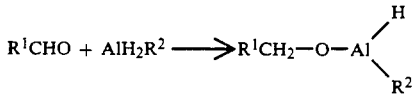

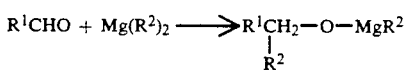

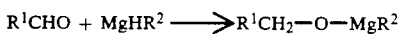

Masking Reactions for Amine Groups

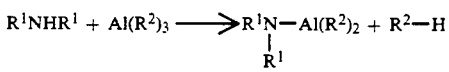

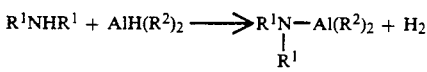

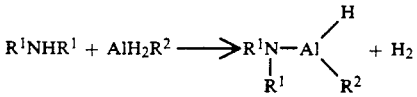

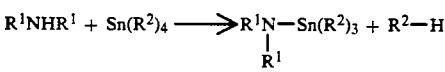

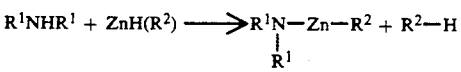

Masking Reactions for Cyano Groups

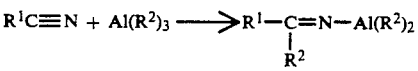

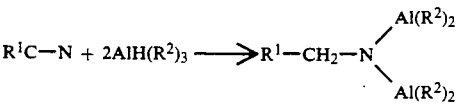

-continued

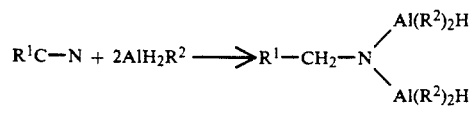

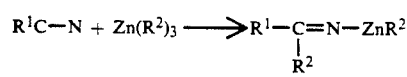

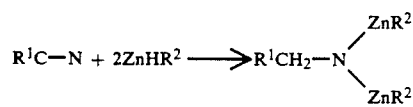

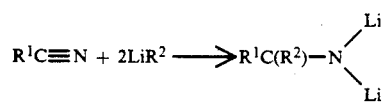

Masking Reactions for Hydroxy Groups

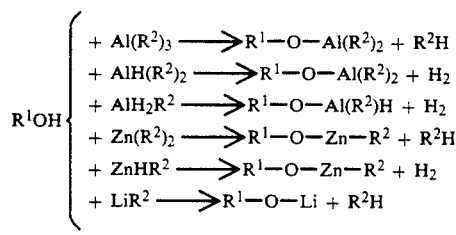

Masking Reactions for Keto Groups

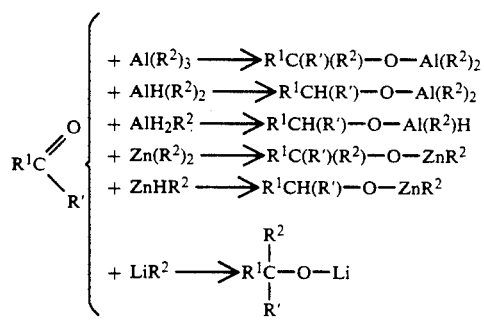

Masking Reactions for Imino Groups

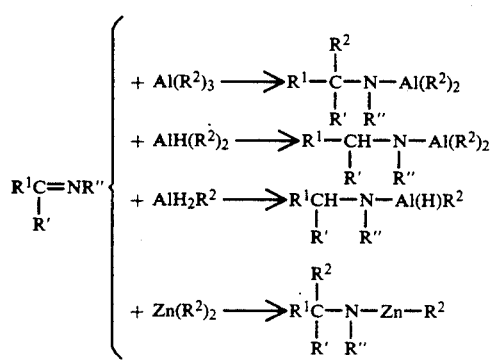

Masking Reactions for Thio Groups

-continued

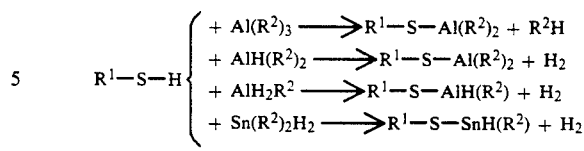

Therefore, when FGMs of the formula:

$$R^1—(X_a)_n$$

wherein $R^1$ and n are as defined above, and $X_a$ is a functional group having an acidic hydrogen (e.g. —COOH, —NHR', —OH, —SH, wherein R' is as defined above), are masked by masking agents of the formula:

$$(H)_{r'}—M'—(hydrocarbyl)_{r''}$$

wherein each hydrocarbyl group can be the same or different and comprise $C_1$-$C_{16}$ hydrocarbyl (as defined above for $R^2$ to $R^5$), M' is divalent, trivalent or tetravalent M (wherein M is as defined earlier), r' is an integer of from 0 to v, and r'' is an integer of from 1 to v, wherein "v" is a number of from 2 to 4 and is the valence of M' in said masking agent, the MFGM obtained comprise members selected from the group consisting of monomers of the formulae:

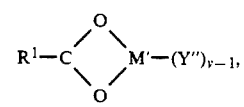  (i)

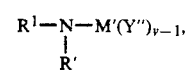  (ii)

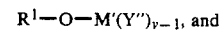  (iii)

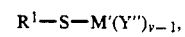  (iv)

where $X_a$ is —COOH, —NHR', —OH, and —SH, respectively, wherein $R^1$, M', and v are as defined above, and wherein Y'' comprises at least one of $R^2$, $R^3$ and $R^4$, wherein $R^2$-$R^4$ are the same or different and are H or $C_1$-$C_{16}$ hydrocarbyl, with the proviso that at least one of $R^2$, $R^3$ and $R^4$ is hydrocarbyl.

Similarly, when FGMs of the formula $$R^1—(X_b)_n$$

wherein $R^1$ and n are as defined above and $X_b$ is a functional group having a carboxy (C═O) or imino group (i.e., —CHO, —CO(R'), and —C(R')═NR'', wherein R' and R'' are as defined above) are masked by masking agents of the formula $$(H)_{r'}—M'—(hydrocarbyl)_{4''}$$

wherein M', r', r'', and hydrocarbyl are as defined above, the MFGM obtained comprise members selected from the group consisting of monomers of the formulae:

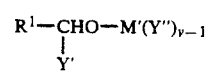  (v)

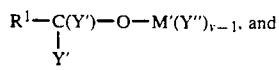 (vi)

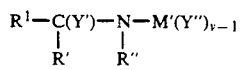 (vii)

when $X_b$ is —CHO, —CO(R') and —C(R')=N(R"), respectively, wherein $R^1$, M' and v are as defined above and wherein Y' is H or $C_1$–$C_{16}$ hydrocarbyl, and Y" comprises at least one of $R^2$ $R^3$ and $R^4$ wherein $R^2$–$R^4$ are the same or different and are H or $C_1$–$C_{16}$ hydrocarbyl, with the provisos that Y' is H when r' is greater than zero, and at least one of $R^2$, $R^3$ and $R^4$ is hydrocarbyl.

Further, when the FGM comprises a monomer of the formula:

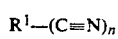

wherein $R^1$ and n are as defined above, and the masking agent comprises metal compounds of the formula:

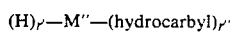

wherein M" is divalent or trivalent M (wherein M is as defined above), r' and r" are as defined above, the MFGM obtained comprise monomers of the general formulae:

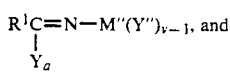 (viii)

 (ix)

wherein $R^1$, M" and v are as defined above, $Y_a$ is $C_1$–$C_{16}$ hydrocarbyl, and Y" is $R^2$, $R^3$ or $R^4$, wherein $R^2$–$R^4$ are the same or different and are H or $C_1$–$C_{16}$ hydrocarbyl, with the proviso that at least one of $R^2$—$R^4$ is hydrocarbyl. Generally, MFGM of formula (viii) are obtained when r' is zero and MFGM of formula (ix) are obtained when r' is greater than zero.

When the above R'(C—N)$_n$ FGMs are masked with metal compounds of the formula:

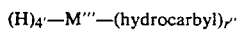

wherein M'" is tetravalent M, and r', r" and hydrocarbyl are as defined above, the MFGM can comprise monomers of the formulae:

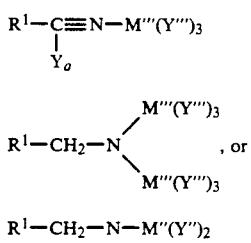

wherein $R^1$, $Y_a$, M'" and Y"" are as defined above, and Y"" is $C_1$–$C_{16}$ hydrocarbyl, MFGMs of formula (x) are obtained by use of M(hydrocarbyl)$_4$, i.e. when r' is zero.

When r' is 1, the MFGM is of formula (xi). When r' is 2 or 3, the MFGM is of formula (xii).

To further illustrate this invention, it has been discovered that 5-norbornene-2-carboxylic acid (NBCA) can be masked with a wide variety of metal alkyls. The 5-norbornene-2-carboxylic acid and metal alkyls react in equimolar proportions with the formation of a partial ester of the metal alkyl and the carboxylic acid and one mole of alkane as shown below:

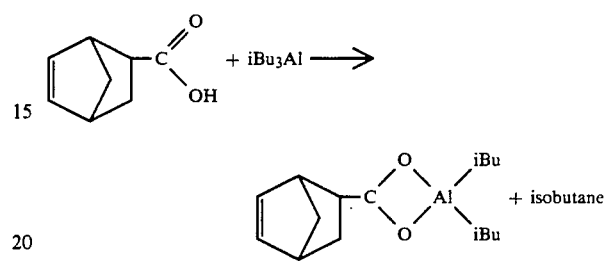

A similar reaction in hydrocarbon solvent has been carried out using 5-norbornene-2-methanol (NBMeOH) in lieu of NBCA with equally good results. NBMeOH is masked by reaction with one mole of triisobutyl aluminum to form the MFGM as follows:

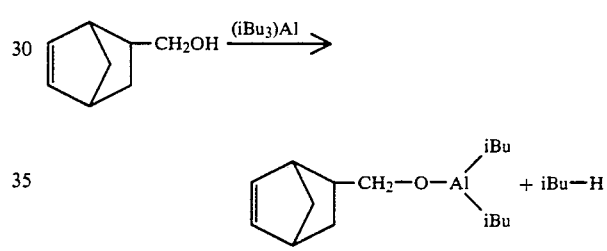

This reaction proceeds with the liberation of one mole of alkane and the formation of an aluminum alkoxide derived from NBMeOH which now lacks the active hydrogen of the alcohol. This material may be further deactivated by aggregation of individual aluminum alkoxide MFGM molecules, which can be illustrated as follows:

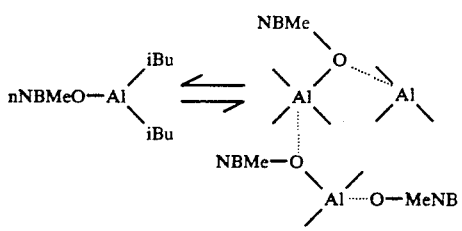

This aggregation is believed to result because the lone pairs of electrons on the oxygen are shared to other electron deficient aluminum atoms to form linear or cyclic structures. These two reactions lead to essentially complete deactivation of the reactivity of the hetero atom in the alcohol residue.

The procedure for the formation of alkoxides is similar to that described herein for the corresponding NBCA derivatives. Accordingly, solutions of NBMeOH in hexane are slowly added to an equivalent amount of alkyl aluminum at −60° C. to 0° C. The exothermic reaction proceeds readily with the liberation of one mole of i-butane and results in the formation of a clear solution of NBMeO-aluminum compound.

The alternative masking procedure uses 5-norbornene-2-carboxy(N-n-butyl) imine reacted with one mole of diisobutyl aluminium hydride in hydrocarbon solvent as shown below:

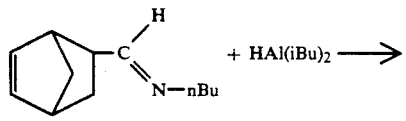

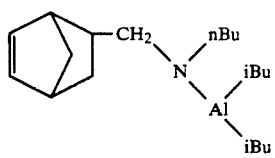

Addition of H—Al occurs across the polarized double bond of the imine leading the the masked functionalized monomer, i.e., MFGM entity. This method of masking functionality is equally applicable to aldehydes or ketones. In a similar reaction, 5-norbonene-2-carboxaldehyde (NBCAld) is reacted with one mole of diisobutylaluminum hydride in hydrocarbon solvent as shown below:

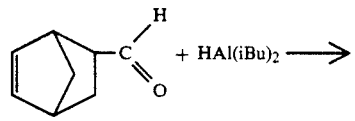

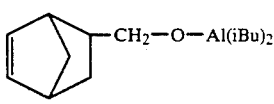

Addition of H—Al occurs across the polarized double bond of the carbonyl group leading to the masked functionalized monomer for the introduction of alcohol functionality. Use of the —C(O)CH₃ substituted monomer, 5-norbonene-2-carboxymethane (NBCMe), can be illustrated as follows:

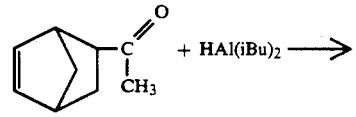

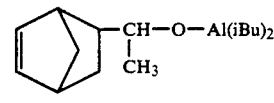

Nitrile-substituted FGMS, e.g. 5-norbornene-2-nitrile, can be masked with two moles of masking agent, e.g. i-Bu₂AlH, to generate a masked amine monomer containing two atoms of M metal (e.g. aluminum) for each nitrogen, although this is not a preferred method of masking the functionality in accordance with the present invention. The masking of a nitrile-substituted FGM can be illustrated as follows:

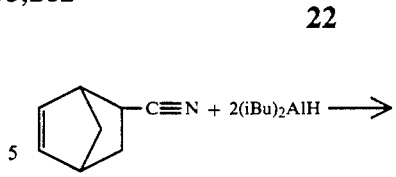

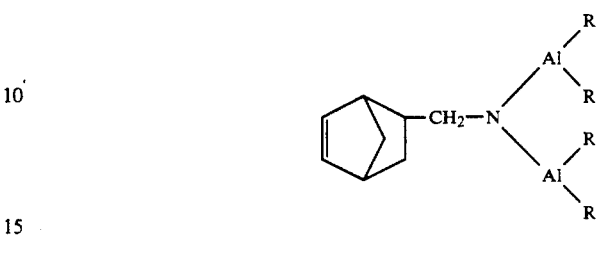

It should be noted that the mutual compatability of different masked monomers, i.e., MFGM arising from the reaction of different FGM with masking agents allow the formation and incorporation of different MFGM into the same polymer. A representative, non-exclusive, example would be to mask a mixture of 5-norbornene-2-carboxylic acid and 5-norbornene-2-methanol with triisobutyl aluminum. Incorporation of this mixture in the polymerization reactor would lead to carboxylic acid and alcohol residues on the same polymer and is a suitable procedure for incorporation of multiple functionality into a polymer in accordance with the present invention.

As compared to the FGM having acidic hydrogens such as those bearing free acid, amine, or alcohol groups, the MFGM formed by these reactions has all potentially reactive functional sites either removed or complexed Thus, the acidic hydrogen has been lost as the alkane for the MFGM formation from NBCA while both the oxygen atoms in NBCA and the nitrogen atom in the imine FGM, which might otherwise interfere with catalyst performance by their lone pair donation, are effectively deactivated by chelation to the metal atom. The resultant MFGM is very stable in hydrocarbon solution (e.g., in hexane), both kinetically and thermodynamically, towards dissociation of the metal, in this particular case aluminum, from the FGM residue. Nevertheless, the masked acid alcohol or amine is very conveniently regenerated, as will be described in more detail below.

As indicated above, a critical requirement for purposes of the present invention is that the masking agent must be non-halogenated. It has been found that halogen-containing organometallic compounds are not suitable as masking agents in practice of the present invention. The reason for this is believed to be that masked, functional group-containing monomers prepared using, e.g., organoaluminum halides, react with the halide compounds by polymerization of the norbornene double bond leading to oligomeric, hydrocarbon-insoluble materials which are not available for incorporation into the polymer chain. Furthermore, this reaction may also involve rearrangement of the norbornene system leading to unreactive MFGM which are unacceptable for incorporation into the polymer. It has been further discovered that the most effective masking is accomplished by reacting functional group-containing monomer with hydrocarbyl aluminum compounds wherein the hydrocarbyl moiety is a bulky group, that is wherein the hydrocarbyl group is substituted (e.g., alkyl-substituted) preferably in the 1- or 2-carbon position, e.g., a branched $C_3$ to $C_5$ alkyl group such as isopropyl, isobutyl or t-butyl.

The disadvantage of using halogenated aluminum alkyls for the formation of MFGM was shown by C-13 NMR evidence given in the accompanying Examples. Additional data was obtained by mixing experiments conducted with NBCA, as a representative FGM, and a a variety of metal alkyls, as shown in the following Table.

TABLE A

| NBCA reacted with | | Appearance of Hexane solution |
|---|---|---|
| 1. | Triisobutylaluminum (TIBA) | Clear pale yellow |
| 2. | Triethylaluminum (TEAL) | Clear |
| 3. | Diethylzinc (DEZ) | Clear |
| 4. | Di-n-hexylmagnesium | Clear |
| 5. | TIBA + 1 eq methanol | Clear |
| 6. | TIBA + 1 eq ethanol | Clear |
| 7. | TIBA + 1 eq t-butanol | Clear |
| 8. | TIBA + 1 eq of isopropanol | Clear |
| 9. | TIBA + 2 eq of isopropanol | Clear |
| 10. | TEA + 1 eq of isopropanol | Clear |
| 11. | TEA + 2 eq of isopropanol | Clear |
| 12. | DEZ + 1 eq of isopropanol | Clear |
| 13. | (0.5 eq TEAL + 0.5 eq DIBAC) | Slightly hazy |
| 14. | same as 13 + 1 eq of isopropanol | Slight hazy |
| 15. | (0.5 eq TEAL + 0.5 eq DEAC) | Haze |
| 16. | same as 15 + 1 eq of isopropanol | Haze |
| 17. | Diisobutylaluminum chloride (DIBAC) | Haze with liquid droplets |
| 18. | Diethylaluminum chloride (DEAC) | Haze with liquid droplets |
| 19. | Ethylaluminumsesquichloride (EASC) | Separates into two phases |
| 20. | Ethylaluminumdichloride (EADC) | Separates into two phases |
| 21. | isobutyaluminumchloride | Separates into two phases |
| 22. | DEAC in presence of 0.05 mol fraction of anisole. | Almost clear |

Note:
All reactions of NBCA and indicated metal alkyls were carried out under these conditions: 0-25° C., 10-60 sec at 1 atmosphere of dry nitrogen, in dry hexane solvent to form a reaction mixture 1-2 molar in the NBCA-metal alkyl reaction product.

From these observations, it can be seen that homogenous solutions of the partial ester MFGM were obtained only with the non-halogen containing alkyl metal compounds. $C_{13}$ NMR data for Runs 1-12 show the FGM reacts stoichiometrically with the non-halogen containing alkyl metal compounds, and show an absence of degradation of the FGM during the masking reactions. While it might be speculated that the separation into two phases and haze observed in Table A Runs 13-21, which are halogenated systems, is a result of the lack of solubility of the chlorinated aluminum alkyl esters formed, it is noted that Run 22 resulted in an almost clear solution. Anisole is a base and acts to retard cationic polymerization. Hence, the cause of haze and phase separation is believed to have been the polymerization of the norbornene ring, with possible rearrangement of the norbornene nucleus. In the case of the reaction product of either NBCA with DEAC or NBCA with EASC, C-13 NMR data show a loss of the intensity of signals associated with the $C_5$-$C_6$ unsaturation coupled with the appearance of other signals not identifiable with either the parent acid or the ester which is the masked, functional group-containing monomer. This evidence supports the conclusion that the reaction of NBCA with chlorinated aluminum alkyls produces a complex mixture of polymerized/rearranged products. Hence, the halogenated aluminum compounds are unsuitable for use as masking agents in the practice of this invention, and therefore, they are not equivalents of the hydrocarbyl aluminum compounds for the purpose of masking functional groups of a monomer.

In view of the foregoing, suitable non-halogenated organometallic compound to be reacted with the acid hydrogen-containing monomer include representative alkyl metals generated from aluminum, zinc and magnesium, such as triisobutylaluminum (TIBA), diethylzinc (DEZ) and di-n-hexylmagnesium (DNHM), as well as hydrides thereof. Although the masking effect using zinc and magnesium compounds is acceptable for purposes of the present invention, it has been discovered (as shown in the data in Example 11) that masking with aluminum compounds is considerably more effective in controlling catalyst poisoning. Accordingly, organoaluminum compounds are preferred over organomagnesium compounds which in turn are more preferable than organozinc compounds. This is somewhat surprising in that the structures of the masked, functional-group-containing monomers resulting from the reaction with the magnesium and zinc organometallic compound are very similar to those which result from using an organoaluminum compound. Although not wishing to be bound by any particular theory, this would appear to indicate that the mere removal of the reactive hydrogen and the complexation of oxygen atoms is not a sufficient condition for the successful masking of the monomer, and tends to indicate that in order for a masking group to function in an acceptable manner for purposes of the present invention it must be stable in the polymerization reactor and should not adversely affect the performance of the catalyst components.

In a preferred embodiment of the process of this invention, the masked, functional group-containing monomer prepared from an alkyl-substituted masking agent is reacted with a lower alkanol (e.g., a $C_2$-$C_5$ alcohol) and preferably a $C_3$-$C_4$ alkanol, e.g., isopropyl, isobutyl or t-butyl alcohol. The alcohols used are, in the order of increasing steric crowding around the carbinol carbon, methanol, ethanol (primary), isopropanol (secondary), and t-butanol (tertiary). The reaction of a masked function group-containing monomers of this invention with a lower alkanol can be illustrated by the following (wherein $R^1$ is as defined above):

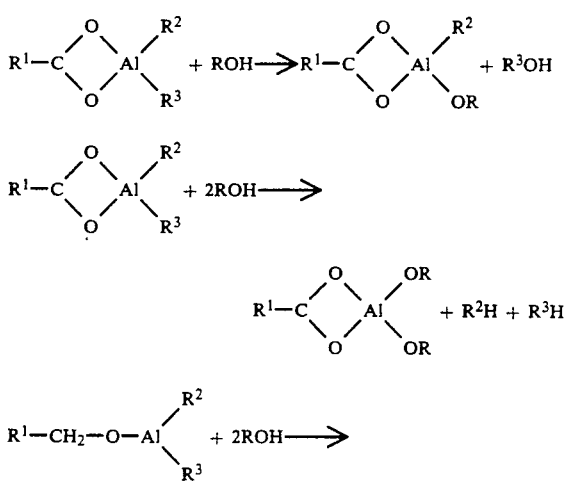

-continued

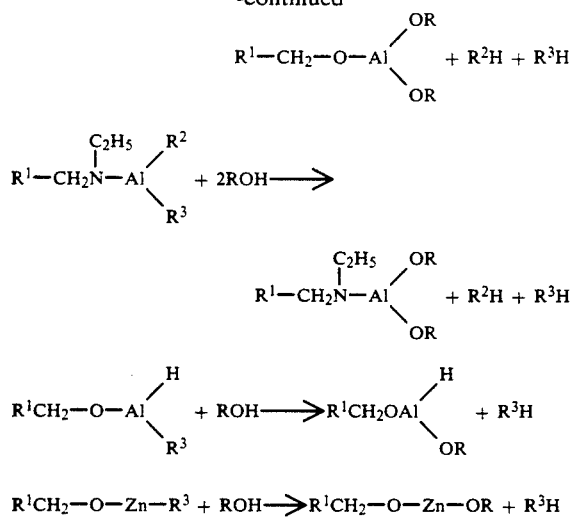

$$R^1CH_2-O-Zn-R^3 + ROH \longrightarrow R^1CH_2-O-Zn-OR + R^3H$$

The reaction products so formed have alkoxy radicals derived from the reactant alkanol bonded to the M metal of the MFGM. The term "alcohol modified MFGM" is used herein to refer to the adducts of MFGM and alcohol prepared in accordance with this preferred embodiment of the present invention. In an illustration of this embodiment, the functional group-containing monomer, NBCA, is initially complexed with TIBA and the resultant hexane soluble product is further reacted with from one to two equivalents of a dry alcohol (e.g., isopropanol). The temperature and other reaction conditions employed in such alcohol modifications of MFGM can be any of those discussed above for the initial masking reaction, and preferably a temperature of from $-30°$ C. to $0°$ C. is used, with from 1:1 to 2:1 molar equivalents of alcohol being used per masked functional group. It has been observed that such alcohol-modified MFGMs are soluble in hexane and are formed even on addition of two moles of alcohol to the MFGM prepared from trialkylaluminum and NBCA.

The resultant polymerizations with alcohol-modified FGM's demonstrate better reactor performance than the results obtained for TIBA complexes alone. This is completely unexpected inasmuch as alkoxide ligands and alcohols are conventionally considered to be poisons, and yet the introduction of these systems in a controlled manner in the polymerization reaction in accordance with the present invention has been found to result with a reversal of any existing catalyst poisoning. Furthermore, the acid is more readily incorporated into the polymer than if a TIBA complex is used alone. Although not wishing to be bound by any particular theory, it is believed that the introduction of the alcohol in the complexing reaction further supresses cationic polymerization of norbornene. In any event, alcohol modification of the masked NBCA complex results in enhanced introduction of quantities of NBCA into the polymer with relatively little loss in the reactor performance. It has been found that further improvement in the degree of steric isolation of the masked NBCA leading to an even lower degree of catalyst deactivation was obtained by different alcohols with the alcohol having the largest steric bulk, i.e., t-butanol, providing the most protection against poisoning with methanol providing the least, and the other alcohols being arranged between these limits in the order of their crowding around the carboxyl group. Accordingly, the alcoholated masked, functional group-containing monomer has been found to result in higher polymerization efficiencies, higher polymer molecular weight and improved incorporation of functional group-containing monomer into the polymer. The mole ratio of alcohol to masked, functional group-containing monomer can be about 1–2:1 and preferably about 1:1.

Polymerization Process

The polymerization process used in accordance with the present invention is performed in an otherwise conventional manner using suitable methods, including batchwise, semibatch or continuous operations, conventional polymer chain monomers, and catalysts known to be effective for such polymerization. The MFGM's used in the present invention have been found to behave in the polymerization like the non-polar homologues of these monomers. The process of the present invention is particularly suitable for producing FGM-ethylene-propylene (EPM) terpolymers and FGM-ethylene-propylene-diene (EPDM) tetrapolymers, and is preferably carried out in one or more conventional reactors, including mix-free reactor systems, continuous flow tubular reactors, and stirred-batch reactors. For purposes of illustration herein, when the process of the present invention is described herein below with respect to a continuous flow stirred tank reactor, the reaction mixture is blended (i.e. backmixed) with the incoming feed to produce a solution of essentially uniform composition everywhere in the reactor.

The monomers which are suitable as polymer chain monomers for purposes of the polymerization process of the present invention include olefin monomers such as ethylene and $C_3-C_{20}$ alpha olefins, and unsaturated, non-conjugated diolefins as described above. Illustrative of functionalized polymers of this invention are homopolymers, co-polymers, terpolymers, or tetrapolymers containing the above olefins and/or diolefins, in addition to the functional group-containing monomers. Exemplary of functionalized polymers produced by this invention are functionalized polypropylenes (propylene homopolymers, propylene-ethylene copolymers containing less than about 10 wt% ethylene, propylene-higher olefin copolymers containing up to about 10 wt% of higher alpha-olefins such as hexene-1, pentene-1, pentene-1, octene-1 and the like), functionalized polyethylenes (ethylene homopolymers and ethylene-propylene co-polymers containing greater than 90 wt%, usually 95 to 99 wt%, ethylene), ethylene-propylene copolymers (e.g., elastomeric EPM), ethylene-propylene-diene terpolymers (e.g., elastomer & EPDM) and the like. It is preferred, however, to perform the present invention in a copolymerization process of alpha-olefins and preferably a mixture of ethylene and propylene to result with an ethylene-propylene (EPM) polymer. The resultant polymer preferably contains about 20 wt% to 90 wt% ethylene and 10 wt% to 80 wt% propylene. It is also preferred to include a non-conjugated diene, such as dicyclopentadiene, 1,4-hexadiene or ethylidene norbornene in the olefin mixture used in the polymerization process in order to introduce unsaturation into the backbone of the resultant polymer (EPDM).

The improved polymers of this invention may be formed by polymerizing polymer chain monomers with the masked, polymerization catalyst, wherein the polymerization catalyst includes at least one vanadium compound, zirconium compound or titanium compound, preferably wherein the vanadium compound has a valence of at least 3 (e.g., 3 to 5), and is preferably selected from the group consisting of vanadium halide, vanadium oxyhalide, and vanadium salts of betadiketonates, with the vanadium halide preferably being vanadium tetrachloride and the vanadium oxyhalide compound having the general formula $VOX'_{n'}(OR^7)_{3-n'}$ where n is an integer of 2 or 3, $R^7$ is a hydrocarbyl radical which is preferably a $C_1$-$C_{10}$ alkyl, phenyl or benzyl and more preferably $C_1$-$C_4$ alkyl (such as a member of the group of methyl, ethyl, and butyl), and X' is halogen which is preferably chlorine or bromine. The vanadium salts of betadiketonates have the general formula of $V(O\sim O)_3$ where $O\sim O$ represents the beta-diketonate anion. The preferred betadiketonate is 2,4-pentanedionate.

The polymerization catalyst preferably also includes an organoaluminum co-catalyst comprising organoaluminum halides and organoaluminum compounds having the formula $R^6AlX''_{(3-x)}$ wherein X'' is a halogen, $R^6$ is a member selected from the group consisting of alkyl and aryl (and preferably wherein $R^6$ is a member selected from the group consisting of $C_1$-$C_{16}$ alkyl and phenyl, which is most preferably ethyl), and x is between 0 and 3, and preferably greater than 0 up to 2 (e.g. between 1 and 2), and more preferably from 1 to 1.2. Illustrative, non-limiting examples of the aluminum halide cocatalyst useful in the practice of this invention include an aluminum trichloride, ethyl aluminum dichloride, diethyl aluminum chloride and ethyl aluminum sesquichloride.

It is preferred to have the vanadium compound and the organoaluminum cocatalyst present in the polymerization catalyst in a molar ratio of vanadium to aluminum of about 1:2 to 1:30, with the molar ratio of vanadium to aluminum more preferably being about 1:5 to 1:15. The catalyst and the masked, functional group-containing monomers (MFGM) may be present in a molar ratio of vanadium to masked, functional group-containing monomers of about 1:5 to 1:100, with the molar ratio of vanadium to masked, functional group-containing monomers preferably being about 1:10 to 1:30. The titanium catalyst has a valence of 2 or greater and is preferably insoluble in the polymerization media. Representative, but not exclusive examples of these catalysts include $TiCl_4$, $TiCl_3$, and $TiCl_3.\frac{1}{3}$ $AlCl_3$ (Stauffer AA Catalysts). The V and Ti catalyst can be supported on conventional catalyst supports (e.g., on silica, $MgCl_2$, zirconium, and the like). Electron donor modified versions of supported V and Ti catalytic systems can also be used.

The preferred catalysts for making elastomeric polymers include vanadium compounds, preferably having a valence of at least 3 and which are soluble in the polymerization diluent, such as $VX'_4$ and $VOX'_3$ wherein X' is halogen, i.e., vanadium halide and vanadium oxyhalide. The preferred vanadium halide is vanadium tetrachloride.

The polymerization reaction zone for polymerization of the MFGM and polar chain monomers(s) can also contain one or more of the conventional polymerization promoters, such as halogenated and non-halogenated organic polymerization promoters.

In addition to the foregoing consideration, the monomer to be selected for purposes of the present invention also depends on the nature of the polymerization process and the catalyst used. The reactivity of unsaturated MFGM towards polymerization, its efficiency of incorporation into the polymer, and its distribution in the polymer is a function of the catalyst system used. Thus changes in the nature of MFGM, particularly in the type of unsaturation, are needed to accommodate the changes in polymerization catalyst.

The preferred kinds of FGM hydrocarbyl radical for some of the most common kinds of olefin polymerization for purposes of the present invention are:

| Catalysts | FGM Hydrocarbyl Radical | Polymer Type |
|---|---|---|
| a. Homogeneous Ziegler Polymerization with Vanadium Catalysts | 5-Norbornene functionalized at C-2 and/or C-7. | Rubbery EP |
| b. Heterogeneous Ziegler Polymerization with Titanium Catalysts | Acyclic alpha-olefin functionalized at C-3 | Crystalline PE, PP |

The difference between the requirements for heterogeneous and homogeneous Ziegler catalysts is primarily due to the much lower reactivity of the norbornene based monomers towards the heterogeneous catalysts. For example, while the incorporation of norbornene based monomers is about 50 to 90% for the vanadium catalysts, it is usually less than about 30% for the titanium catalysts. Accordingly, the polymerization process is preferably a homogeneous Ziegler polymerization because of a higher incorporation of the monomer, and where the MFGM is a norbornene carrier, it is incorporated at about 50 to 90% with vanadium catalyst and at less than 30% with titanium catalyst. The present invention is, therefore, often described herein with respect to homogenous polymerization using vanadium catalyst.

Inasmuch as the polymerization reaction used for purposes of the present invention is otherwise conventional, the polymerization reaction can be carried out at any temperature suitable for Ziegler catalysis such as a temperature of about $-20°$ C. to about 150° C., or preferably about 0° C. to about 100° C. and more preferably about 15° C. to about 60° C. The pressure used in the polymerization process can vary from about 0 Kpa to about 3000 Kpa and preferably from about 20 Kpa to about 1500 Kpa; more preferably about 100 Kpa to about 1000 Kpa and 250 Kpa to 100 Kpa, most preferably about 300 Kpa to about 600 Kpa.

The masked, functional group-containing monomer should not be premixed with any halogen-containing component of the polymerization catalyst (e.g. vanadium halide or organoaluminum halide) and left to stand for any appreciable period of time because it has been found that the halide-containing catalyst components have a tendency to react with the masked, functional group-containing monomer in which case the metal-bound hydrocarbyl groups of the MFGM will be displaced by halogen. The consequence will be MFGM degradation, including polymerization/rearrangement reactions similar to those encountered when functional group-containing monomer is reacted with an organo-aluminum halide masking agent as described above. It has surprisingly been found that the polymerization results with a greater efficiency of incorporation of the masked, functional group-containing monomer to yield a higher molecular weight polymer, and with decreased incorporation of halogen into the resultant polymer.

Preferably, the MFGM is added to the polymerization reaction zone separately from the polymerization catalyst components, so as to first contact the polymerization catalyst in the presence of the polymer chain monomer(s), preferably under polymerization conditions.

Any known diluent or solvent for the reaction mixture that is effective for the purpose can be used in conducting polymerization in accordance with the present invention. For example, suitable diluents or solvents would be hydrocarbon solvents such as aliphatics, cycloaliphatics, and aromatic hydrocarbon solvents, or halogenated versions of such solvents. The preferred solvents are $C_{12}$ or lower straight-chain or branched-chain, saturated hydrocarbons, and $C_5$ to $C_9$ saturated alicyclic or aromatic hydrocarbons, or $C_2$ to $C_6$ halogenated hydrocarbons. Most preferred are $C_{12}$ or lower straight-chain or branched-chain hydrocarbons particularly hexane. Non-limiting illustrative examples of diluents or solvents are butane, pentane, hexane, heptane, cyclopentane, cyclohexane, cycloheptane, methyl cyclopentane, methyl cyclohexane, isooctane, benzene, toluene, xylene, chloroform, chlorobenzenes, tetrachloroethylene, dichloroethane and trichloroethane.

The polymerizations of the invention can be carried out in the presence of a molecular weight regulator to produce a polymer having any particular desired molecular weight. A molecular weight regulator commonly used in this type of process is, for example, hydrogen. The amount of molecular weight regulator to be used can easily be chosen based on principles well-known to those skilled in the art, depending upon the desired molecular weight of the polymer.

It is within the scope of this invention to incorporate hydrogen as a feed stream to the polymerization zone to moderate polymer molecular weight. The hydrogen will be generally added in an amount of from about 0 to about 30 mole percent, based on the total monomer (MFGM+PCM).

After polymerization, the polymerization is quenched at the exit of the reactor. This quenching can be accomplished by the introduction into the polymerization reaction mixture (e.g., in the reactor or into polymerization product effluent stream) of water, lower alkanol, or aqueous acid (e.g. aqueous HCl) as quench liquid, generally using from 1 to 30 moles of quench liquid per mole of total V and Al in the reaction mixture.

It has been found that the desired functionality group, i.e., X, incorporated into the functionalized polymer as the masked functional group, can be regenerated by removal of the masking metal, M, through use of conventional de-ashing techniques, wherein the quenched polymerization product, containing masked-functionalized polymer, the polymerization catalysts, and unreacted monomers, is contacted with an aqueous liquid, e.g., water, aqueous solutions containing mineral acids (e.g., HCl, HBr, $HNO_3$, $H_2SO_4$, $H_3PO_4$, and the like), aqueous solutions containing mineral bases (e.g., caustic ammonia, sodium methoxide and the like) or mixtures thereof. The resulting hydrolysis reactions (hereinafter referred to as "de-ashing") liberate the metal masking agent and regenerates the functional group, thereby forming a functionalized polymer. Such hydrolysis reactions can be illustrated as follows:

| Masked-Functionality Polymer | Functionalized Polymer |
|---|---|

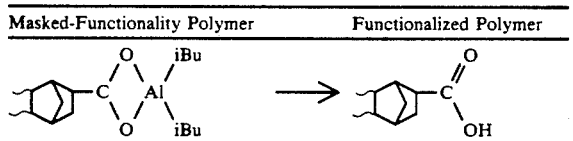

-continued

| Masked-Functionality Polymer | Functionalized Polymer |
|---|---|

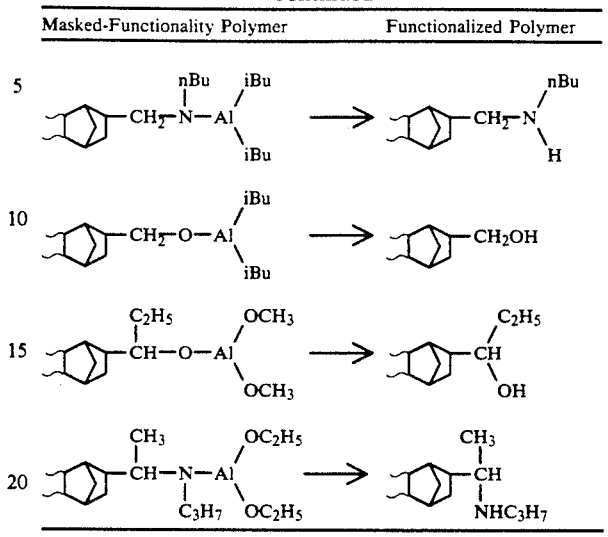

De-ashing to regenerate the functional group, can be conveniently accomplished by contacting the quenched polymerization product with from 0.3 to 3 volumes of water per volume of polymerization reactor effluent (in equivalent units); the water may optionally contain from 1 to 30 wt% (e.g. 3 to 10 wt%) of mineral acid(s). The mixture is contacted for a time and under conditions sufficient to de-ash the polymer and to regenerate the functional group. Generally, the contacting will be conducted for a time of from about 3 to 30 minutes, and a temperature of from about 0° C. to 85° C., with vigorous stirring. The use of an acidic aqueous liquid may be followed by one or more water washes of the separated polymer to remove residual amounts of the mineral acid. The 2-phase liquids resulting in the above steps will permit recovery of a polymer-containing upper liquid phase comprising the functionalized polymer and polymerization solvent or diluent, and an aqueous lower liquid phase containing the mineral acid, and aqueous soluble salts of the catalyst and masking agent metal(s). The aqueous layer will preferably also contain unreacted FGM, due to the water solubility of the FGM attributed by the hydrophilic nature of the "X" functionality.

The polymer may be recovered from the upper phase by flash evaporation followed by drying to remove residual water. The flashing technique can involve the addition of the quenched polymerization product to a tank of hot water (50° C. to 100° C.) sprayed with steam to strip off the solvent and unreacted monomers. The polymer may be then dried by evaporation of water, generally at temperatures of from about 150° C. to 200° C., e.g. on a hot rubber mill.

The functional group-containing monomer is present in the resultant functionalized polymer in an amount of from about 0.01 to about 40 wt%, by total weight of the functionalized polymer preferably in an amount of from about 0.1 to about 20 wt%, more preferably in an amount of from about 0.75 to about 10 wt%, and most preferably in an amount of from about 1.0 to about 7 wt%. The preferred ethylenepropylene copolymers of this invention will, therefore, comprise from about 20 to 90 wt% ethylene, from about 10–80 wt% propylene, and from about 0.01 to 40 wt% functional group-containing monomer, more preferably from about 0.1 to 20 wt%, still more preferably from about 0.75 to 10 wt%, and most preferably from about 1 to 7 wt%, functional group-containing monomer. The preferred ethylene-propylene-diene terpolymers of this invention will therefore comprise from about 20-90 wt% ethylene, from about 10-80 wt% propylene, from about 0.5 to 15 wt% (and more preferably from about 1 to 10 wt%) non-conjugated diene, and from about 0.01 to 40 wt%, more preferably from about 0.1 to 20wt%, still more preferably from about 0.75 to 10 wt%, and most preferably from about 1 to 7 wt%, functional-group containing monomer.

Polymer Characteristics

It has been found that some polymers made according to prior art procedures, particularly those made by precomplexing the FGM with aluminum halo alkyls, have a nonhomogeneous distribution of functionality between the polymer chains. Such polymers can be analyzed to show that they consist of at least two components, one of which contains a much higher level of functionality than the other. The "level of functionality" as used herein is defined to be equivalents of functionality (e.g. —COOH, —C(O)R, etc.) per unit weight of the polymer, and is commonly expressed for these polymers in milliequivalents of functionality per 100 gms of polymer.

It has also been found that the highly functionalized polymer component made by the prior art procedures is a relatively minor component of the resultant polymer, has a lower molecular weight, but exhibits a much greater level of functionality, than that of the other polymer components. Compositional analysis of these low molecular weight component materials indicates that they consist essentially of polymerized FGM (arising out of non-Ziegler prepolymerization of the FGM during attempted masking with aluminum haloakyls) and are thus different in composition than the remainder of the polymeric materials which include both PCM and FGM, with the latter as the minority. These details have been studied and explained by G. A. Lindsey in *Block Copolymer: Science and Technology*, MMI Press Symposium Series, Vol. 3, 53 (1979), published by Harwood and incorporated herein by reference.

While not wishing to be bound by any particular theory, it is believed that the choice of masking agents, particularly the use of aluminum halo alkyls, leads to the prepolymerization reactions of the unsaturation in $R^1$ in the FGM. This leads not only to a multi-component polymer but also to a non-homogeneous distribution of functionality. In summary, polymers made by prior art processes are nonhomogeneous in composition with a higher level of functionality in the polymer component of lower molecular weight.

The polymers made in accordance with the present invention, however, differ from polymers made by prior art processes in that the concentration of functionality (that is, the wt % incorporated FGM) is substantially uniform for chains of all molecular weights. Furthermore, polymers made in accordance with the present invention cannot be separated into two or more significant fractions (e.g. >5 wt% of total polymer) which have different compositions arising from different levels of incorporation of FGM and PCM.

Non-homogeneity in the distribution of functionality in the polymer has been found to be detrimental to achieving the desired polymer properties and an impediment to the prospective application of functionalized polyolefins Functionalized polyolefins are desirably formed such that they contain a pendant localized functionality on long polymer chains. Aggregation of functionality in components of the polymer having lower molecular weights leaves the majority of the polymer chains with little or, in the extreme cases, no functionality. A representative but not exclusive example of the detrimental effects of such an nonhomogeneous functionalized system would be in use of the functionalized polyolefin in a cross linking reaction, which depended on the presence of functionality. Only the low molecular weight fraction and not the bulk of the polymer would form cross-links.

The distribution of functionality in a polymer can be readily determined by methods known in the art. One technique is to tag a random fraction of the functionality with a UV-visible chromophore. The tagging is done by a specific chemical reaction (i.e. esterification, amidation) on the functionality of choice with a reagent carrying the UV-visible chromophore tag. The tagging reaction is chosen to be one where the tagged functionality will exist in that state through the subsequent investigations. The chromophore found to be particularly suitable for this purpose is the phenyl ring and procedures for derivatizing carboxyl, hydroxyl and amino functionalities with suitable phenyl group containing agents are well known in the art. The derivatized polymer is analyzed by a gel permeation chromotographic procedure and the effluent is analyzed by two detectors, i.e., one for the quantity of the polymer and the other sensitive to the concentration of the chromophore. The uniformity of functionality distribution in the original polymer is observed by coincident responses of the two above mentioned detectors.

In contrast to polymers produced in accordance with the present invention, it has been found that polymers made according to the prior art processes, particularly those made by adding halogenated catalyst reactivators, have large quantities of halogen incorporated in them. The presence of halogens apparently occurs in two forms: (i) as inorganic halides arising from the presence of salts of transition or non-transition elements, or (ii) as organic halides where the halogen atom is covalently bound to the carbon atom. While not wishing to be bound by any particular theory, it is believed that the inorganic halides arise from the inadequate removal of catalyst residues, while the organic halides arise from residues and/or reactions of the catalyst reactivators. The presence of organic halides is objectionable since they appear to be incorporated in the polymer and typically have a deleterious effect on the final performance of the material. In particular, they lead to corrosion of metal surfaces in contact with the polymer and the liberation of toxic organic halides at high temperatures. It is, therefore, desirable to produce polymers containing only small amounts of halides, with only a negligible fraction of the amount existing as organic halides. Organic halides are not only the residue of catalyst reactivators but they may also be products of reaction of the polymer chain with activator. In any event, organic halides are a further modification of the polyolefin chain and a distinguishably different composition of matter.

In accordance with the preferred embodiments of the present invention, therefore, it is possible to produce polymers of low total halogen content and also polymers essentially devoid of any organic halide. Preferably, the polymers produced in accordance with the present invention contain less than 0.10 wt%, and preferably less than 0.03 wt%, of total organic chlorine, with an organic chloride content measured by the absorbance of 1/100 inch thick film of the polymer at 610 cm$^{-1}$ of less than 0.05, and preferably 0.03, absorbance units. These polymers are consequently measurably different from those produced by prior art processes.

Analytic Methodology Used in Examples

The polymerization rate was determined by weighing the amount of rubber obtained in a fixed time period. Monomer conversion and catalyst efficiency (weight of polymer products/wt. vanadium catalyst feed) were determined to characterize the catalyst activity. Infrared analysis (ASTM D3900) was used to measure polymer ethylene content while refractive index [I. J. Gardiner & G. Ver Strate, Rubber Chem. Tech., 46, 1019 (1973)] was used for ENB content. In the absence of ENB in the polymer, this was also used as a semi-quantitive measure of FGM content in the polymer. Polymer Mooney viscosity was measured by ASTM D-1646.

Molecular weight (number-average, $\overline{M}_n$; weight average, $\overline{M}_w$; z average, $\overline{M}_z$) and molecular weight distribution (MWD=$\overline{M}_w/\overline{M}_n$) were measured using a Waters 150 gel permeation chromatograph equipped with a Chromatix KMX-6 on-line light scattering photometer. The system is used at 135° C. with 1,2,4-trichlorobenzene as the mobile phase. Showadex (Showa-Denko America, Inc.) polystyrene gel columns 802, 803, 804 and 805 were used. The technique utilized is described in *Liquid Chromatography of Polymers and Related Materials III*, J. Cazes, editor, Marcel Dekker, 1981, p. 257 et seq., incorporated herein by reference. No corrections for column spreading are employed; however, data on generally accepted standards, e.g., National Bureau of Standards Polyethylene 1484 and anionically produced hydrogenated polyisoprene demonstrate that such corrections on $\overline{M}_w/\overline{M}_n$ or $\overline{M}_z/\overline{M}_w$ are less than 0.10 units. $\overline{M}_w/\overline{M}_n$ was calculated from an elution time-molecular weight relationship, whereas $\overline{M}_z/\overline{M}_w$ is evaluated using a light scattering photometer. The $\overline{M}_w/\overline{M}_n$ are used as an indication of MWD breadth (the larger the value, the broader MWD). Polymers made according to the disclosures of this invention were analyzed for functionality content by infra red spectroscopy. Polymers containing carboxylic acid functionality were molded in a pad of uniform thickness between 3 to $20 \times 10^{-3}$ inch thick. The infra red spectrum of this sample contained an intense absorption at 1710$^{-1}$ cm due to the carbonyl group. The intensity of the absorption was measured in absorbance units ($A_1$). This was correlated to the concentration of acid functionality expressed in milliequivalents per 100 gm of polymer ($C_{acid}$) by the following relationship:

$$C_{acid}=A_1/t_1 \times 23.8$$

where $t_1$ is the thickness of the polymer sample pad expressed in thousandth of an inch.

Polymers containing alcohol functionality (P—CH$_2$OH) were dissolved in hexane (approx. 3 wt.% solution) and quantitatively esterified with an equal volume of acetic anhydride, according to the reaction below:

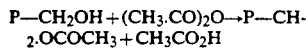

After refluxing for two hours, the polymer was recovered, molded in a pad of uniform thickness between 0.003 to 0.02 inch thick. The infrared spectrum of the sample contained an intense absorption at 1743 cm$^{-1}$ due to the carbonyl group. The intensity of this absorption was measured in absorbance units ($A_2$). This was correlated to the concentration of milliequivalents alcohol functionality expressed in milliequivalents per 100 gm of polymer ($C_{alcohol}$) by the following relationship:

$$C_{alcohol}=A_2/t_2 \times 84.2$$

where $t_2$ is the thickness of the polymer sample pad expressed in thousandth of an inch.

Polymers containing amine functionality were similarly amidated with acetic anhydride and the intensity of the carbonyl absorption at 1660 cm$^{-1}$ of a molded pad of uniform thickness measured in absorbance units ($A_3$) was correlated to the concentration of amine functionality expressed in milliequivalents per 100 gm of polymer ($C_{amine}$) by the following relation:

$$C_{amine}=A_3/t_3 \times 72.9$$

where $t_3$ is the thickness of the polymer sample expressed in thousandth of an inch.

These analytical relations were obtained by measuring the infrared extinction coefficients for the carbonyl groups and closely related monomeric model compounds in hexane media. Typically the experiment was conducted with the derived FGM and repeated to cover the span of obtainable concentrations of functionality. In all cases, Beer's law was found to be obeyed by the chromophore between the concentration of 0–30 meq/100 gms of polymer.

Polymers in accordance with the present invention were analyzed for the distribution of functionality among the polymer chains (i.e., intermolecular functionality concentration distribution). The distribution of functionality in the polymers for purposes of tests run and comparisons made in connection with this application is measured by a chromatographic technique.

Uniformity (or "homogeneity") of functionality distribution is measured by observing the variation in the extinction coefficient, that is the ratio of the concentration of the chromophore to the total weight of the polymer as a function of functionalized polymer chain molecular weight. A polymer with a substantially uniform functionality distribution has this ratio substantially constant over a wide range of polymer chain molecular weights. Polymers made by the procedures of this invention have the above-mentioned ratio varying by from about to 15%, and more preferably from about 0 to 10%, in the chain molecular weight range of 10$^3$ to 10$^9$, provided the molecular weight range is such that the polymer components contain at least 95%, and preferably 97%, of the total weight of polymer, and that at least 95%, and preferably 97%, of the total equivalents of the functionality are included.

Uniformity of composition was also determined by a solvent fractionation technique. In this procedure, a polymer hexane solution containing approximately 1-2 grams of polymer per 100 ml. of solvent was treated judiciously with isopropanol to precipitate a fraction of the polymer. The precipitated polymer was equilbrated for 30 minutes with the bulk of the solution and then removed by filtration. More fractions were obtained by further addition of aliquots of isopropanol to the filtrate until the polymer was almost completely precipitated. The last fraction was obtained by evaporating the filtrate to a solid residue. Typically, the polymer was divided into 8 or 10 fractions and they were analyzed for ethylene residue content by infrared spectroscopy and for norbornene residue content by changes in refractive index. As indicated by the test results, polymers made in accordance with the present invention had substantially uniform compositions of FGM, within the chain molecular weight range of $10^3$ to $10^9$, which amount to within 15% and more preferably within 10% of the average for the whole polymer. The analysis of the norbornene residue content indicate that no fraction of the polymer analyzed contained more than 7% and preferably 5%, of the total weight of the polymer, and that no fraction of the polymer analyzed contained 35% or more of the total amount of functionality in the polymer.

Polymers made in accordance with the present invention were also analyzed for halogen content. For purposes of this application, the halogen content of the polymer was determined only for chlorine residues which appear to be the largest fraction of halogen contaminates. Nevertheless, the analysis can be generalized to other applicable halogens, i.e., bromine. Chlorine was determined by elemental analysis according to instrumental techniques established in the art and organic chloride content in the polymer was determined by the intensity of the absorbance of a polymer film of standardized thickness at 610 cm$^{-1}$ in the infrared spectrum where C—Cl bonds absorbs strongly.

The following examples are presented below to illustrate the foregoing discussion for a better understanding of the invention. All parts, proportions and Although the examples may be directed to certain embodiments of the present invention, they are not to be viewed as limiting the invention in any specific respect. In the following examples, the following abbreviations have these meanings:

EADC = ethyl aluminium dichloride
EASC = ethyl aluminium sesqui chloride
DEAC = diethyl aluminium chloride
TEAL = triethyl aluminium
MONIBAC = mono isobutyl aluminium chloride
DIBAC = di isobutyl aluminium chloride
TIBA = tri isobutyl aluminium
DEZ = diethyl zinc
DNHM = di n-hexyl magnesium
DIBAL-H = di isobutyl aluminium-hydride
NBCA = 5-norbornene-2-carboxylic acid
NBCXA = 5-norbornene-2-carboxaldehyde
NBDCA = 5-norbornene-2,3-dicarboxylic acid
NBMeOH = 5-norbornene-2-methanol
VAA = vinyl acetic acid
ACA = acrylic acid
MeOH = methanol
EtOH = ethanol
iPrOH = 2-propanol
t-BuOH = tert-butanol
S-BuOH = sec-butanol

EXAMPLE 1

The following experiment was carried out to confirm the suitability of the masked, functional group-containing monomers formed by reacting an acid hydrogen source, such as carboxylic acid, and metal alkyls. In the following procedure, 5-norbornene-2-carboxylic acid (NBCA) was reacted with halogenated and non-halogenated metal alkyls, i.e., TEA, DEAC, EASC, TIBA, DEZ and DNHM. The procedure involved adding a solution of 10 mmol of NBCA contained in 25 ml of dry hexane to a solution of the metal alkyl (10 mmol) in 20 ml of hexane. The addition was done dropwise under an atmosphere of nitrogen with cooling of the reaction vessel to maintain the temperature at or about 0° C. The rate of addition of the NBCA was adjusted to be not more than 5 ml/min, and under these conditions clear hexane solutions or the masked monomer was obtained on reaction with nonhalogenated metal alkyls. Experiments with reverse order of addition (metal alkyl to NBCA solution) led to copious formation of hexane-insoluble solids.

The formation of resultant masked, functional-group containing NBCA monomers were characterized by both C-13 NMR and IR spectroscopy. For the C-13 analysis, the samples were made by reacting equimolar quantities of NBCA and the particular metal alkyl chosen in a 10 ml micro reaction vessel inside a dry-box. The reaction temperature was maintained at or near ambient by adding the NBCA slowly to a hexane solution of the metal alkyl. The final concentration of the complexed acid was approximately 1.0 Molar. About 2.5 ml of the solution was transferred to a 10 mm od C-13 NMR tube containing a coaxial 5 mm od tube containing perdeutero DMSO for frequency lock. The sealed tube was brought out of the dry-box and immediately introduced into the NMR spectrometer. The formation reaction was monitored by observing the olefinic carbon atoms and the carboxylic carbon of the monomer only because their resonances at approximately 140 ppm and 180 ppm, respectively, are far removed from those of hexane at 0–30 ppm The results are tabulated below:

TABLE I

| | C-13 NMR DATA FOR NBCA COMPLEX WITH ALKYL METALS | | | | | | |
|---|---|---|---|---|---|---|---|
| | | CARBOXYLIC CARBON | | OLEFINIC CARBON | | | |
| | | | | C-5 | | C-6 | |
| RUN # | COMPOUND | endo | exo | endo | exo | endo | exo |
| Control | NBCA | 182 | 180 | 137 | 136.3(168) | 134.8 | 131.6(170) |
| 1 | NBCA + TIBA (1:1) | 182 | 181 | 139.8 | 137.0(175) | 134.2 | 131.0(169) |
| 2 | NBCA + DEZ (1:1) | 182 | 180 | 136.8 | 136.0 | 134.5 | 131.5 |
| 3 | NBCA + DNHM (1:1) | 184 (broad) | 136 (broad) | 133 (broad) | | | |
| 4 | NBCA + TIBA + t-BuOH | 182 | 184 | 139.8 | 137 | 133 | 131 |

TABLE I-continued
C-13 NMR DATA FOR NBCA COMPLEX WITH ALKYL METALS

| RUN # | COMPOUND | CARBOXYLIC CARBON | | OLEFINIC CARBON | | | |
|---|---|---|---|---|---|---|---|
| | | | | C-5 | | C-6 | |
| | | endo | exo | endo | exo | endo | exo |
| 5 | (1:1:1) NBCA + EASC (1:1) | | 185(m) | | 138(m) Broad Multiplet for all resonances | | 131(m) |
| 6 | NBCA + DEAC (1:1) | | 186(m) | | 138(m) Broad Multiplet for all resonances | | 131(m) |

(Numbers in parenthesis are $^{13}$C—H coupling constants in $H_z$; m = multiplet of resonances)

The foregoing tests indicate that the reaction of NBCA with non-halogenated metal alkyls, such as DEZ, TIBA and TEA lead to a single masked NBCA monomer because the number of lines seen for NBCA in the carboxylic acid region correspond exactly to those seen for the masked NBCA monomer, with each line consisting of a pair of unequal intensity corresponding to the presence of unequal amounts of the exo-endo isomers of the parent acid. Moreover, in all of the masked NBCA monomers, there appears to be very little reduction of the carboxylic acid functionality as evidenced by the presence of the carboxylic acid carbon resonance in a very narrow range between 178 ppm and 182 ppm. Furthermore, the position of the olefinic carbons, i.e. C-5 and C-6, in the same positions throughout the series of transformations, indicate that no skeletal rearrangement is occuring in this reaction. Thus, the basic norbornene skeleton is left intact. Related to this, the unchanged values of the C—H coupling constants, i.e. 172±5 Hz, which are characteristic of olefinic carbons, indicate that reaction with non-halogenated metal alkyls does not lead to a significant amount of cationic polymerization of the norbornene double bond. In contrast, the reaction with halogenated metal alkyls, such as EASC and DEAC, leads to a rapid polymerization of the norbornene double bond which results with the formation of hexane insoluble oligomers and to a multiplicity of peaks at each position for the carboxylic and olefinic carbons. Further, the intensity of resonance of the olefinic carbon is lowered with respect to the carboxylic carbon which corresponds to the transformation of unsaturated carbon to saturated carbons by polymerization. This shows that halogenated metal alkyls by promoting extraneous reactions, are unsuitable for masking FGM to form required MFGM.

EXAMPLE 2

Vinyl acetic acid (VAA) is another suitable acidic hydrogen source which can be reacted with a metal alkyl to form a masked, functional group-containing monomer useful for purposes of the present invention. The procedures of Example 1 were repeated, except that the FGM comprised vinyl acetic acid (VAA) which was treated in separate runs with one equivalent of non-halogenated metal alkyls (TIBA and DEZ) to form masked carboxylic acid group containing monomers. These samples were analyzed by C-13 NMR spectroscopy in a manner similar to that described in Example 1. The data is shown is Table II which appears below:

TABLE II
C-13 NMR ASSIGNMENT FOR VAA, VAA-TIBA AND VAA-DEZ IN HEXANE

| TYPE/SOURCE OF CARBON | CONTROL VAA (ppm) | RUN 1 VAA + TIBA (1:1) (ppm) | RUN 2 VAA + DEZ (1:1) (ppm) |
|---|---|---|---|
| OLEFINIC CARBON CH$_2$ | 117.8 | 118.0 | 116.5 |
| CH | 129.7 | 127.7 | 129.0 |
| ALIPHATIC CARBON - CH$_2$ | 37.8 | 41.5 | 41.1 |
| CARBOXYLIC CARBON - C | 177.1 | 178.8 | 179.2 |

Notes:
All spectra were in hexane solution.
Small amounts (<5%) of products from an isomer of VAA, 2-methyl acrylic acid are also seen.
Reaction with DEAC/DIBAC gave multiplet at each position.

As indicated by these results, the low temperature reaction of one equivalent of trialkyl aluminum with the carboxylic acid leads to the quantitative formation of a single complex species. It does not appear as though there is any reduction of the carboxylic acid system since only one resonance is visible in that region. Additionally, there does not appear to be any evidence for the polymerization of the double bond because the resonances for these carbons appear in the region expected for the unsaturated carbons with CH coupling constants of the order of 168-172 Hz which is expected for an unsaturated carbon rather than 125 Hz for a fully saturated species. Similar results were obtained for reaction with diethyl zinc. In contrast, the reaction with halogenated aluminum alkyls have been found to lead to an immediate and exothermic polymerization of the double bond. The polymers formed are insoluble in hexane while the low molecular weight oligomers show an attenuation of the double bond resonance with the concommittant formation of a multiplicity of peaks in the carboxylic acid region due to the formation of a number of species by the complexation/polymerization process. In addition, every resonance for the parent VAA can be fully accounted for by a resonance of the complexed acid with TIBA and DEZ. In all the cases, the multiplicity of the lines observed in the coupled spectra for each pair of corresponding lines was exactly the same thus indicating an identical skeletal distribution of carbon and hydrogen atoms and accordingly similar structures for VAA and the VAA monomer masked by TIBA.

EXAMPLE 3

Acrylic acid (ACA) monomer masked with TIBA was made in essentially the same manner as the masked vinyl acetic acid of Example 2 and an analysis of the material by C-13 NMR shows that a discrete complex of the carboxylic acid and the trialkyl aluminum was formed by low temperature mixing of equimolar quantities of the reactants in hexane solution. The results are shown in Table III below:

TABLE III

| C-13 NMR ASSIGNMENT FOR ACA, ACA-TIBA AND ACA-DEZ. | | | |
|---|---|---|---|
| TYPE/SOURCE OF CARBON | CONTROL ACA (ppm) | RUN 1 ACA + TIBA (ppm) | RUN 2 ACA + DEZ (ppm) |
| OLEFINIC CH$_2$ | 127.5 | 129.0 | 128.8 |
| CARBON —CH | 130.0 | 138.8 | 130.0 |
| CARBOXYLIC —C | 170.5 | 170 | 171 |

Notes:
All spectra are in hexane solution.
Reaction with DEAC/DIBAC led to complete precipitation.

The data indicates that the addition of trialkyl aluminum to acrylic acid in dilute hexane solution leads to the formation of the 1:1 complex of the acid and the aluminum alkyl, with no evidence of the reduction of the carboxylic acid group to ketones or alcohols. The carbon resonances of the parent acid are closely correlated to the resonances of the complex acid both in the position of the resonance and the multiplicities of the coupled C—H spectra.

EXAMPLE 4

Following the procedure of Example 1, NBMeOH was reacted in separate runs at 0° C. with an equivalent molar amount of TIBA, DIBAC, and DEAC. The course of reaction was identified by the C-13 NMR of the solutions. Solutions of the reaction of NBMeOH with metal alkyls suitable for NMR analysis were prepared as described in Example 1. The results are shown in the following table.

TABLE IV

| C-13 NMR Data for NBMeOH Complex with Metal Alkyl (Data only for principle isomer) | | | |
|---|---|---|---|
| | | | Olefinic Carbon |
| Run No. Compound | Carbinol Carbon | C-5 | C-6 |
| Control NBMeOH | 64.2(t,135) | 135.3(d,165) | 131.2(d,170) |
| 4-1 NBMeOH + TIBA (1:1) | 66.2(t,135) | 136.7(d,170) | 130.3(d,172) |
| 4-2 NBMeOH + DIBAC (1:1) | 67 (multiplet) | 137 (multiplet) | 130.1 (multiplet) |
| 4-3 NBMeOH + DEAC (1:1) | 66–69 (multiplet) | 137 (multiplet) | 130 (multiplet) |

(Three digit numbers in parentheses are $^{13}$C—H constants in H$_z$; d and t refer to the multiplicity of resonance lines in the coupled spectra [d = doublet; t = triplet])
All spectra in hexane solution only
Data reported in ppm from TMS The foregoing tests indicate that the reaction of NBMeOH with non-halogenated metal alkyls, such as DEZ or TIBA, lead to a single masked monomer because the number of lines seen for NMBeOH correspond exactly to those seen for the MFGM only when the complexing alkyl is non-halogenated The conclusions about the integrity of the norbornene structure in the efficiency of masking are identical to those proposed for the corresponding NBCA masked structures. Similar reaction with halogenated aluminum alkyls leads to multiplicity of resonance lines indicating prepolymerization/cleavage of the norbornene ring system, which are unsuitable for the formation of MFGM.

Related to this, NBMeOH is a preferred monomer because of its ready volatility (bp=97° C. at 20 mm) and its slight solubility in water.

An alternative route to the formation of the MFGM from FGM which do not contain an active, easily replaceable hydrogen but rather a polarized carbon-heteroatom double bond is illustrated for the formation of an amine containing MFGM in the following example.

EXAMPLE 5

In separate runs, 2.5 mmol of NBCXA dissolved in 10 ml of hexane was slowly added, with stirring, to a cold solution of 2,5 mmol of either n-butyl amine, or amine in hexane. The addition was performed under a nitrogen atmosphere and the reaction temperature was maintained at 0° C. by external cooling. The reaction mixture was stirred for 30 minutes and to the resultant cloudy mixture was added 20 gms of 4 Angstrom dry molecular sieve. After 30 minutes of contact with agitation the clear solution of n-butyl imine or phenyl imine, respectively, of NBCXA was decanted off into a dry nitrogen filled flask. To this solution was added 2.6 ml of a 15% solution of DIBAL-H in hexane under nitrogen over a period of 30 seconds. The solution temperature was allowed to warm to ambient temperature (25° C.) and after 30 minutes a pale yellow solution of the masked amine monomer was obtained.

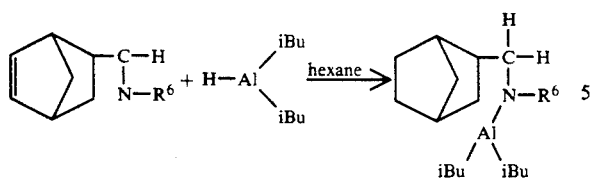

wherein $R^6$=nBu or Ph

The course of the reaction was identified by C-13 NMR the solutions. Solutions of the reaction with metal alkyls suitable for NMR analysis were prepared, and C-13 NMR of the solutions was observed as described earlier. The NMR results are shown in the Table below.

TABLE V

C-13 NMR Data for 5-Norbornene-2-Carboximine Complex with Diisobutylaluminum hydride (Data for Principle Endo Isomer Only)

| Compound | Carbox Carbon | Olefinic Carbon | |
|---|---|---|---|
| | | C-5 | C-6 |
| 5-Norebornene-2-Carboxaldehyde (1) | 198(d,1701) | 136.3(d,173) | 131(d,171) |
| 1 + BuNH$_2$(1:1)(2) | 164.4(d,150) | 135.9(d,168) | 131.5(d,170) |
| 1 + PhNH$_2$(1:1)(3) | 166.5(d,153) | 136.1(d,170) | 131(d,165) |
| 2 + (i-Bu)$_2$AlH(1:1) | 72(t,130) | 136(d,165) | 132(d,170) |
| 3 + (i-Bu)$_2$AlH(1:1) | 69.2(t,32) | | |

All spectra in hexane solution only
Data in ppm from TMS; numbers in parenthesis are coupling
$^{13}$C-$^1$HC (d = doublet; t = triplet)

These experiments indicate that the reduction of 5-norbornene-2-carboxyimine (Products 2 or 3) with di-isobutyl aluminum hydride leads to the formation of a single masked amine monomer. We have independent observations that in the presence of halogenated aluminum alkyls the formation of oligomers/norbornene degradation products are observed.

EXAMPLE 6

Part A

The following procedure illustrates the formation of a MFGM ester having the formula:

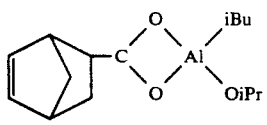

In a sample preparation, 77.8 ml of a 25% solution of tri-isobutyl aluminum (0.2 mole) in hexane was added to 25ml of purified hexane at 25° C. The mixture was stirred under nitrogen and cooled to 0° C. in an ice bath. Over a period of several minutes, 120 ml of hexane solution containing 17.8 gm of NBCA was added to this cold solution. An exothermic reaction proceeded very rapidly liberating approximately one equivalent of a gas identified to be isobutane by GC. The reaction mixture was maintained at 0° C. At the end of the addition period, the flask contained a clear light yellow solution of the NBCA ester of diisobutylaluminum as follows:

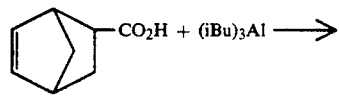

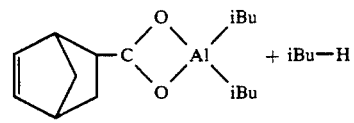

Part B

To this solution was added a mixture of 10.2 ml of isopropanol (0.2 mole) in 25 ml of hexane at about 0° C. Although not as exothermic as the previous reaction, this reaction resulted in a clear hexane solution of NBCA ester of isobutylisopropoxyaluminum as follows:

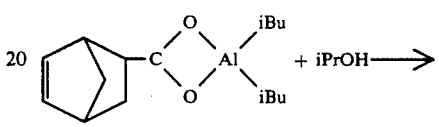

EXAMPLES 7, 8, AND 9

The procedure of Example 6, part B, was repeated in separate runs employing DEZ, DNHM or TEAL instead of the TIBA as the masking agent. Substantially similar results were obtained in formation of the desired masked functional monomer, i.e., the NBCA ester of isobutylisopropoxyaluminum.

EXAMPLE 10

79.0 g of 5-norbornene-2-carboxaldehyde (NBCXA), (77.6 ml., 0.647 mole) were dissolved in 500 ml. of hexane. 47.3 g of n-butylamine (64 ml. 0.647 mole) was slowly added at 25° C. The solution was stirred for five minutes and cooled to −18° C. for several hours. The liquid hexane layer was decanted under nitrogen to remove the precipitated water which had frozen to ice and adhered to the sides of the reaction vessel. The clean hexane solution was removed under nitrogen to a separate reactor and dried with 50 gms of dried 4A molecular sieve. After thirty minutes, the hexane layer containing the n-butyl imine of NBCXA was separated from the molecular sieves and to it was added at −10° C. 80 3 gm. (0.647 mole) of diisobutylaluminum hydride as stirred under nitrogen for one hour to yield the MFGM of 5-norbornene-2-methyl-(N-n-butyl) amine. The reactions are summarized below:

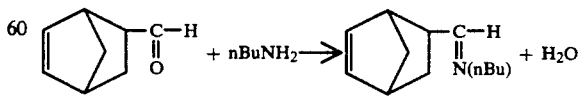

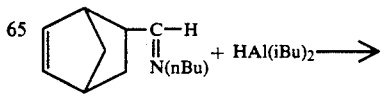

-continued

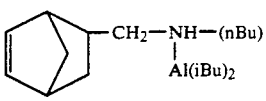

EXAMPLE 11

In this example, NBCA masked with TIBA, DEZ, and DNHM to form the MFGM as made in Examples 1-1, 7 and 8 was introduced in successive experiments into an EP polymerization reactor. The object was to determine which of the masking agents was the most effective. Efficiency of masking is determined from the results of the polymerization experiment. Effective masking agents are indicated by high polymerization rates, low ethylene content of the polymer, and formation of high molecular weight of polymers.

Ethylene-propylene polymer functionalized with —COOH generating groups was prepared in a conventional continuous flow stirred tank reactor (CFSTR) having a 1 liter capacity. Conditions and the results of polymerization are shown in the following Tables.

In this Example (and in the polymerization Examples that follow) the polymers, prior to analysis or characterization, were withdrawn from the reactor and quenched with an aqueous solution containing 10 wt% HCl (equal volume of quench liquid to volume of polymerization mass), and the resulting liquids were agitated in a Waring mixer at 1000 rpm for 15 minutes at 25° C., then transferred to a separating funnel to remove the aqueous layer. The above steps were repeated with an equal volume of a fresh aqueous solution (1 wt% HCl). The resulting clear organic liquid was steam stripped to remove the polymerization solvent (hexane).

TABLE VI

Conditions

Temperature = 25° C.
Pressure = 500 Kpa gauge
Al/V Mole Ratio = 10 for catalyst components only
Residence Time = 9 minutes Feeds Hexane = 4.11 kg/hr.
Ethylene = 95 g/hr.
Propylene = 138 g/hr.
$VCl_4$ = 0.493 g/hr.
EASC = 3.162 g/hr.
NBCA = as in the following Table

TABLE VII

| Run No. | MFGM NBCA reacted with 1 eq. | Polymerization Rate (g/hr.) | Polymer (wt % ethylene) | $M_L$ (1 + 8) 100° C. |
|---|---|---|---|---|
| 11-1 | TIBA | 173 | 50 | 12 |
| 11-2 | DNHM | 157 | 53 | 3 |
| 11-3 | DEZ | 103 | 72 | 1 |

Notes:
NBCA precomplexed with metal alkyl to form the MFGM, introduced at 2.05 g/hr calculated as NBCA.
$M_L$ = Mooney viscosity with large rotor This example shows that masking with aluminum alkyls is the most effective way of forming MFGM.

EXAMPLE 12

In this Example, BMCA masked with aluminum halo alkyls of the general formula Al $Et_{3-a}Cl_a$ (a has values of 0-2) was introduced in successive experiments into an EP polymerization reactor. The object was to determine which of the masking agents lead to the highest incorporation of NBCA in the final polymer Carboxylic acid content in the final polymer was determined by the 1R technique previously described.

Ethylene-propylene polymer was prepared in a conventional continuous flow stirred tank reactor having a one liter capacity and the results of the polymerization are shown in the following Tables:

TABLE VIII

Conditions

Temperature = 25° C.
Pressure = 500 Kpa gauge
Al/V molar ratio = 10 for catalyst components only
Residence Time = 9 minutes Feeds Hexane = 4.11 kg/hr.
Ethylene = 95 g/hr.
Propylene = 138 g/hr.
$VCl_4$ = 0.493 g/hr.
EASC = 3.162 g/hr.
FGM = 2.05 g/hr. masked as above

TABLE IX

| Run No. | Masking Aluminum Alkyl: $AlEt_{(3-a)}Cl_a$; a = | NBCA Conversion (%) |
|---|---|---|
| 12-1 | 0.0 | 50 |
| 12-2 | 0.5 | 38 |
| 12-3 | 1.0 | 27 |
| 12-4 | 1.5 | 12 |
| 12-5 | 1.75 | 12 |

The results of the example shows that only trialkyl aluminum masking agents lead to high conversion of NBCA to carboxylic acid functionality in the polymer.

EXAMPLE 13

In this Example, NBCA masked with aluminum alkyls of the general formula $AlR_3$ (R = ethyl, isobutyl) was prepared using the procedure of Example 1-1. The resulting MFGM was introduced in successive experiments into an EP polymerization reactor. The object was to determine which of the masking agents lead to polymers having the highest molecular weight. The molecular weight was measured as the Mooney viscosity at 100° C.

Ethylene propylene polymer was prepared in a conventional continuous flow stirred tank reactor having a one liter capacity. The polymerization and results of the polymerization are shown in the following Tables.

TABLE X

Conditions

Temperature = 25° C.
Pressure = 500 Kpa gauge
Al/V molar ratio = 10 for catalyst components only
Residence Time = 9 minutes Feeds Hexane = 4.11 kg/hr.
Ethylene = 95 g/hr.
Propylene = 138 g/hr.
$VCl_4$ = 0.493 g/hr.
EASC = 3.162 g/hr.
FGM = 2 05 g/hr. masked as above

TABLE XI

| Run No. | Masking AlR₃ | Polymer Ethylene Content (wt. %) | M (1 + 8) 100° C. | Polymerization Rate (g/hr) |
|---|---|---|---|---|
| 13-1 | Et | 51 | 4 | 169 |
| 13-2 | iBu | 50 | 12 | 173 |

This example shows that bulky alkyl groups lead to polymers of the highest molecular weight with all other polymerization parameters being identical within experimental accuracy.

EXAMPLE 14

In this Example, NBCA masked with triisobutyl aluminum (as in Example 1-1) is reacted in successive experiments with one equivalent of alkanol, ROH (R=Me, Et, iPr and t-Bu) and the resulting alcohol modified MFGM product, comprising isobutyl (OR) aluminum ester of NBCA, is then introduced into an EP polymerization reactor. The object was to determine which of the alcohol substituents lead to the most effective masking group. Effectiveness of masking was determined by analysis of the polymerization process and evaluation of the final polymer. Effective masking groups that lead to high polymerization rate, low ethylene content, high carboxylic acid content and high molecular weight are favorable properties of the final polymer.

Ethylene-propylene polymer was prepared in a conventional continuous flow stirred tank reactor having a one liter capacity. The polymerization conditions and the results of polymerization are shown in the following Tables:

TABLE XIII

Conditions

Temperature = 25° C.
Pressure = 500 Kpa gauge
Al/V molar ratio = 10 for catalyst components only
Residence Time = 9 minutes Feeds Hexane = 4.11 kg/hr.
Ethylene = 95 g/hr.
Propylene = 138 g/hr.
VCl₄ = 0.493 g/hr.
EASC = 3.162 g/hr.
FGM = 2.05 g/hr. masked as above

TABLE XIV

| Run No. | NBCA Masked with TIBA; reacted with 1 eq ROH ROH | Polymerization Rate (g/hr) | Polymer Ethylene (wt %) | NBCA Conv. (%) | $M_L$ (1 + 8) 127° C. |
|---|---|---|---|---|---|
| 14-1 | none | 189 | 50 | 49 | 12 |
| 14-2 | MeOH | 186 | 53 | 59 | 14 |
| 14-3 | EtOH | 187 | 51 | 70 | 16 |
| 14-4 | iPrOH | 189 | 50 | 68 | 17 |
| 14-5 | t-BuOH | 193 | 47 | 73 | 18 |

These results show that effectiveness of the alcohols increases from Runs 14-2 through 14-5 and that the bulky alcohols iPrOH and t-BuOH are particularly useful in forming an effective mask for NBCA.

EXAMPLE 15

In this example, NBCA masked with TIBA as in Example 1-1 was introduced into an EP polymerization reactor. The object was to determine if changes in the composition of the cocatalyst ($Et_bAlCl_{3-b}$; b=2 to 0.5) lead to more effective polymerization. Effectiveness of polymerization was determined by analysis of the polymerization process and evaluation of the final polymer. High polymerization rates, low ethylene content, high carboxylic acid content and high molecular weight are favorable properties.

Ethylene-propylene polymer was prepared in a conventional continuous flow stirred tank reactor (CFSTR) having 3.875 liter capacity. The polymerization conditions and the results of polymerization are shown in the following Tables:

TABLE XV

Conditions

Temperature = 27° C.
Pressure = 500 Kpa gauge
Al/V molar ratio = 12 for catalyst components
Residence Time = 9 minutes Feeds Hexane = 15.7 kg/hr.
Ethylene = 361 g/hr.
Propylene = 706 g/hr.
VCl₄ = 1.884 g/hr.
NBCA = FGM 10.99 g/hr. (masked with TIBA)
Cocatalyst = (as in Table XVI)

TABLE XVI

| Run No. | Cocatalyst Composition | Mole Ratio of Metal-Alkyl/ Metal-Cl in Reactor | Polymerization Rate (g/hr) | Polymer C2= (wt. %) | NBCA Conv. (%) | Mol. Wt. Mn. (1) |
|---|---|---|---|---|---|---|
| 15-1 | Et₂AlCl | 3.35 | 760 | 42 | 69 | 60000 |
| 15-2 | Et₁.₅Cl₁.₅ | 1.91 | 706 | 44 | 70 | 49000 |
| 15-3 | EtAlCl₂ | 1.18 | 867 | 39 | 68 | 53000 |
| 15-4 | Et₀.₆₆AlCl₂.₃₃ | 0.86 | 763 | 43 | 72 | 62000 |
| 15-5 | Et₀.₅AlCl₂.₅ | 0.74 | 726 | 45 | 71 | 66000 |

Note:
(1) number average molecular weight

The results of this example show optimum results of polymerization are obtained when the cocatalyst of the composition is used, such as the mole ratio of metalalkyl/metal-Cl in the reactor is ~1.

In this Example, NBCA masked with TIBA as in Example 1-1 was introduced into an EP polymerization reactor. The object was to illustrate the use of VOCl$_3$ as a component of the catalyst system for copolymerizing the MFGM from NBCA into EP chains.

Ethylene-propylene polymer was prepared in a conventional continuous flow stirred tank reactor having one liter capacity. The polymerization conditions and the results are shown in the following Tables:

TABLE XVII

Temperature = 25° C.
Pressure = 500 Kpa gauge
Al/V molar ration = 10 for catalyst only Residence time = 9 minutes Feeds Hexane = 4.11 kg/hr.
Ethylene = 95 g/hr.
Propylene = 138 g/hr.
VOCl$_3$ = 0.656 g/hr.
EASC = 4.70 g/hr.
Hydrogen = 100 wppm on Ethylene
NBCA as in Table XVIII masked with TIBA

TABLE XVIII

| Run No. | NBCA rate (g/hr) | Polymerization Rate (g/hr) | Polymer Ethylene Content (wt %) | NBCA (conv %) |
|---|---|---|---|---|
| | nil | 159 | 50.1 | — |
| 16-1 | 1.03 | 152 | 52.4 | 90 |
| 16-2 | 2.06 | 145 | 56.0 | 52 |
| 16-3 | 3.10 | 146 | 57.4 | 48 |
| 16-4 | 4.12 | 137 | 62.8 | 57 |

The results of this example show that VOCl$_3$ is an acceptable catalyst for incorporating the MFGM of NBCA into EP polymer.

EXAMPLE 17

In this Example, NBDCA was masked with TIBA employing the procedure of Example 1-1, except that two equivalents TIBA was used. The resulting MFGM was introduced into an EP polymerization reactor. The object was to determine if the MFGM from NBDCA was polymerized into the EP chain. Ethylene-propylene polymer was prepared in a conventional continuous flow stirred tank reactor (CFSTR) having 1 liter capacity. The polymerization conditions and the results of the polymerization are shown in the following tables:

TABLE XIX

Conditions

Temperature = 25° C.
Pressure = 500 Kpa gauge
Agitation = 1200 rpm
Al/V molar ratio = 10 for catalyst components only
Residence = 9 minutes Feeds Hexane = 4.1 kg/hr.
Ethylene = 95 g/hr.
Propylene = 138 g/hr.
VCl$_4$ = 0.493 g/hr.
EASC = 3.162 g/hr.

NBDCA = as a 2:1 TIBA complex according to Table XX

TABLE XX

| Run No. | NBDCA Feed (g/hr) | Polymerization Rate (g/hr) | Polymer Analysis Ethylene Content (wt %) | $M_L(1+8)$ 127° C. | NBDCA Conv. (%) |
|---|---|---|---|---|---|
| 17-1 | 1.03 | 214 | 48 | Low | 70 |
| 17-2 | 2.06 | 206 | 53 | 3 | 59 |
| 17-3 | 3.08 | 197 | 59 | 17 | 62 |
| 17-4 | 4.11 | 152 | 62 | 34 | 49 |

The following are given by way of non-limiting examples of the present invention wherein different functional group-containing monomers are used in the polymerization.

EXAMPLE 18

In this example, 5-norbornene-2-methanol was masked with TIBA, as in Example 4-1. The resulting MFGM was introduced into an EP polymerization reactor. The object was to determine whether this MFGM was suitable for incorporation of primary alcohol functionality in EP polymers. Polymerization was conducted in a conventional continuous flow stirred tank reactor as in Example 12. The conditions for the polymerization are shown in Table XXI and the results of polymerization in Table XXII.

Table XXI

Conditions

Reactor = 3.875 liter
Temperature = 30° C.
Pressure = 500 Kpa gauge
Agitation = 1200 rpm
Residence = 9 min.
Al/V Molar Ratio = 8 for catalysts compounds only Feeds Hexane = 15.8 kg/hr.
Ethylene = 363 g/hr.
Propylene = 630 g/hr.
Hydrogen = 30 w ppm on ethylene
NBMeOH = 5.92 g/hr. as 1:1 MFGM with TIBA Cocatalyst Run 18-1 = DEAC 9.51 g/hr.
Run 18-2 = DEAC 4.76 g/hr. + EASC 4.87 g/hr.
Run 18-3 = EASC 9.75 g/hr.
Run 18-4 = EASC 4.87 g/hr. + EADC 4.99 g/hr.
Run 18-5 = EADC 9.98 g/hr.

TABLE XXII

| Run No. | Polymerization Parameters Rate (g/hr) | Catalyst efficiency g/g | Polymer Properties Ethylene Content (wt %) | NBMeOH (conv %) | $M_L(1+8)$ (100° C.) |
|---|---|---|---|---|---|
| 18-1 | 652 | 343 | 53.1 | 83 | 12 |
| 18-2 | 776 | 409 | 45.2 | 92 | 16 |
| 18-3 | 853 | 450 | 41.5 | 89 | 29 |
| 18-4 | 873 | 460 | 39.9 | 83 | 34 |
| 18-5 | 869 | 458 | 40.5 | 87 | 37 |

The results of this experiment show that the MFGM generated by the reaction of 5-norbornene-2-methanol with TIBA is acceptable for the incorporation of primary alcohol functionality in EP polymers.

EXAMPLE 19

In this example, the MFGM obtained by reacting 5-norbornene-2-carbox-(N-n-butyl) imine with diisobutyl aluminum hydride in an equimolar ratio was introduced into an EP polymerization reactor. The object was to determine if this MFGM was acceptable for introducing secondary amine functionality in EP. The MFGM was made according to the procedures described below.

77.6 ml of 5-norbornene-2-carboxaldehyde (NBCXA) (79.0 gm) was slowly added to a solution of 64 ml of n-butylamine (47.4 gms) in 500 ml of hexane solution. The mixture was allowed to stand for 3 hours at 0° F. and separated from the precipitated water. The clear hexane solution was dried by standing over 4A° mole sieves for 2 hours and slowly added to a solution of 80.2 gm of diisobutyl aluminum hydride in 1000 ml of hexane at $-30°$ C. under a nitrogen blanket. After 3 hours at room temperature, the resultant solution was ready for introduction into the polymerization reactor. The conditions of polymerization are shown in Table XXIII and the results in Table XXIV:

Table XXIII

Conditions

Reactor = 3.875 liter (CFSTR)
Temperature = 27° C.
Pressure = 500 Kpa gauge
Agitation = 1200 rpm
Residence = 9 min.
Al/V Molar Ratio = 10 for catalysts compounds Feeds Hexane = 23.9 liters/hr.
Ethylene = 363 g/hr.
Propylene = 643 g/hr.
$VCl_4$ = 1.896 g/hr.
EASC = 1.22 g/hr.
EADC = 12.48 g/hr.
Hydrogen = 120 w ppm on ethylene
FGM (masked as above) = 23.40 g/hr.

TABLE XXIV

| Polymerization Parameters | | Polymer Proportion | | |
|---|---|---|---|---|
| Rate (g/hr) | Catalyst Efficiency (g/g) | Ethylene Content (wt %) | $M_L$ (1 + 8) (100° C.) | MFGM (conv %) |
| 766 | 405 | 45.8 | 18 | 93 |

The results of this example show that the MFGM generated by the addition of diisobutyl aluminum hydride to imines is an acceptable method for incorporating amine functionality in EP.

EXAMPLE 20

In this example, EP polymers obtained by the procedures described earlier (in Examples 12-1, 12-3, 18-4 and 19) were analyzed for distribution of functionality along the polymer chains. The object was to demonstrate that only the formation of MFGM by reaction with non-halogenated aluminum alkyls lead to a substantially uniform distribution of functionality in the polymer chain. Four polymers were analyzed by (i) the gel permeation chromatography method and (ii) the solvent-nonsolvent fractionation method according to the procedures outlined earlier and described in detail below:

Case A 3.75 g of the polymer made in accordance with Example 12-3 by masking 5-norbornene-2-carboxylic acid with diethyl aluminum chloride (a = 1 in Table IX) was dissolved in 75 ml of 1:1 hexane/tetrahydrofuran mixture and modified according to the procedures of Example 12-3 with 1.2 gms of 3-phenyl-1-propanol After 2 hours of reaction, the polymer component in the reaction mixture was quantatively recovered by removal of volatiles under reduced pressure. Gel permeation chromatography of the polymer with two sequential detectors, as previously described, produce the response shown in FIG. 1. As can be seen, it is evident that the distribution of functionality is quite distinct from the distribution of polymer mass as a function of molecular weight. In particular, the former is a complicated distribution which shows a distinct maxima centered at $3 \times 10^3$ amu while the molecular mass is a symmetrical curve centered at about $8 \times 10^4$. Similarly, the ratio of the UV signal to the polymer mass, shown in FIG. 2, as a function of chain molecular weight constantly varies between the ranges $7 \times 10^2$ and $10^5$ with the largest varying about 15 times that of the smallest. This shows that the distribution of the functionality in the polymers is not uniform according to the definitions of this application. This also shows that the use of a halogenated aluminum alkyl is unacceptable for the formation of a MFGM from the FGM.

10.3 gms of this polymer was dissolved in 500 ml of hexane. To the clear solution was added with magnetic stirring isopropanol from a burette. After addition of approximately 35 ml of isopropanol a slight white precipitate was obtained. The rate of addition of isopropanol was slowed to ~1 drop/minute and agitation continued until a sizeable amount of polymer was precipitated. The precipitated polymer was equilibrated with the remaining solution by slow agitation at room temperature for 30 minutes. The slurry was filtered through a weighed filter paper and the residue dried to obtain the first fraction. To the filtrate was added a further amount of isopropanol (approx. 7 ml) to precipitate the second fraction which was removed in an identical manner. Continuing this process eight fractions of approximately equal weight were obtained with the last fraction being obtained by evaporation of the filtrate of the seventh precipitation. The fractions were labelled in their order of precipitation and each aliquot was recovered, dried and analyzed according to the techniques described above. The results are shown below in Table XXV:

TABLE XXV

| Fraction | wt (gms) | Ethylene Content (wt %) | FGM Content (1) (wt %) |
|---|---|---|---|
| 1 | 1.5 | 60 | 0.2 |
| 2 | 1.0 | 57 | 0.2 |
| 3 | 1.3 | 56 | 0.3 |
| 4 | 1.7 | 56 | 0.2 |
| 5 | 1.5 | 53 | 0.0 |
| 6 | 1.3 | 50 | 0.2 |
| 7 | 1.2 | 52 | 1.7 |
| 8 | 0.8 | 37 | 5.2 |

Note (1):
FGM content determined by refractive index of the polymer; this number is proportional to the actual amount of FGM in the polymer.

In this example, the data show that the FGM is between the concentration of FGM in the lowest and highest levels is greater than a factor of 25. This also shows that the use of halogenated aluminum alkyls is not acceptable for the formation of MFGM from FGM as it leads to unequal levels of functionality in different fractions of the polymer.

Case B 3.9 gms of the polymer made in Example 12-1 with triethyl aluminum (TEAL) as the masking agent (a=0 in Table IX) was dissolved and partially esterified with 3-phenyl-1-propanol as in Case A. GPC analysis of the resultant esterified polymer produced two response signals, i.e., one for the UV detector at 254 nm sensitive to the pressure of aromatic rings and, therefore, to the existence of carboxylic acid residues and the other to the polymer mass as a function of the molecular weight of the chain. The two signals, shown in FIG. 3, are coordinated thereby indicating an even distribution of FGM in the polymer chains. Quantitative analysis of this data is done by observing the ratio of UV detector response to the polymer chain as a function of the molecular weight of the chain. This data, for 95% of the polymer between polymer chain molecular weights of $8 \times 10^2$ to $6 \times 10^6$, is shown in FIG. 4. This shows, in contrast to Case A, that this ratio is constant within the limits defined for this application with maximum at $10^3$ which is about 20% larger than seen for the minimum at $6 \times 10^6$.

11.3 gms of this polymer was dissolved in 500 ml of hexane and precipitated in eight fractions of approximately equal weight by addition of judicious amounts of isobelled in their order of precipitation and each aliquot was removed by filtration, dried and analyzed according to techniques described above. The results are shown below in Table XXVI.

TABLE XXVI

| Fraction | wt (gms) | Ethylene Content (wt %) | FGM Content (1) (wt %) |
|---|---|---|---|
| 1 | 1.7 | 63 | 1.4 |
| 2 | 1.5 | 60 | 1.6 |
| 3 | 1.3 | 59 | 1.5 |
| 4 | 1.3 | 60 | 1.4 |
| 5 | 1.2 | 59 | 1.6 |
| 6 | 1.6 | 57 | 1.4 |
| 7 | 1.3 | 55 | 1.5 |
| 8 | 1.4 | 49 | 1.6 |

Note (1):
FGM constant determined by refractive index of the polymer; this number is proportional to the actual amount of FGM in the polymer.

In this case, the above data shows that the FGM is substantially evenly distributed in all fractions of the polymer. This demonstrates that polymer made by incorporating the MFGM formed by the reaction of NBCA and triethyl aluminum is acceptable to form a random polymer of the FGM and the other PCM.

Case C 2.5 gms of the polymer made in Example 18-4 with TIBA as the masking agent was dissolved in 100 cc of hexane and then reacted by refluxing under nitrogen with 0.5 gms of phenyl isocyanate for 2 hours. The primary hydroxy groups in the polymer were phenylamidated by this process according to the reaction shown below:

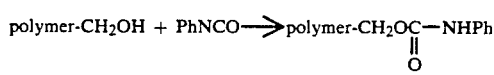

While no attempt was made to have a quantative conversion of all of the hydroxy groups in the polymer, the method ensures that a significant and random fraction of the polymer bound hydroxy groups are tagged with a phenyl group. This partially amidated polymer was chromatographed on a gel permeation chromatograph as described earlier and the effluent was analyzed by two in-line detectors, i.e., (i) a UV detector operating at 254 mm which is sensitive to the presence of the phenyl groups linked by amide bonds to the FGM residues in the EP polymer, and (ii) a polymer mass detector. The responses of these two detectors, as a function of chain molecular weight, is shown in FIG. 5. Evaluation of the response curves indicates that these two signals are coordinated and a more quantitative result is obtained by observing the extinction coefficient, determined as the ratio of the UV detector signal to the polymer mass as a function of molecular weight. This data, which is shown in FIG. 6, indicates that the phenyl groups in the amidated polymer which arise by random tagging of the hydroxyl groups in the original polymer are evenly distributed in the polymer within the limitations of this application. Thus, for 95% of the polymer mass between the molecular weights of $1 \times 10^3$ and $6 \times 10^6$, the variation in the ratio is about 9% with the maximum at $6 \times 10^6$ and the minimum near $5 \times 10^5$.

9.7 gms of the polymer made in Example 18-4 with TIBA as the masking agent (Run 18-4 of Table XXII) was dissolved in 500 ml of hexane and precipitated in eight successive fractions by the judicious addition of isopropanol as described previously. The fractions were labelled in their order of precipitation, recovered and dried. They were analyzed for composition according to the method shown earlier by refractive index. The data is shown in Table XXV:

TABLE XXV

| Fraction | wt (gms) | FGM Content (wt %) (1) |
|---|---|---|
| A | 1.2 | 1.0 |
| B | 1.3 | 1.2 |
| C | 1.2 | 1.1 |
| D | 1.2 | 1.0 |
| E | 1.4 | 1.2 |
| F | 1.2 | 1.1 |
| G | 1.2 | 1.0 |
| H | 1.0 | 1.2 |

Note (1):
FGM content determined by refractive index, which is proportional to actual weight percent.

This case shows that the MFGM generated by the reaction of TIBA with 5-norbornene-2-methanol is acceptable for formation of polymer with the substantial uniform distribution of hydroxy functionality in all fractions.

Case D 10.2 gms of the polymer made in Example 19, with diisobutyl aluminum hydride as the masking agent, was dissolved in 500 ml of hexane and precipitated as described previously in eight successive fractions by the judicious addition of isopropanol. The fractions were labelled in their order of precipitation, recovered and dried. They were analyzed for composition according to the method shown earlier by a combination of infrared spectroscopy and refractive index.

TABLE XXVI

| Fraction | wt (gms) | FGM Content (wt %) (1) |
|---|---|---|
| 1 | 1.2 | 1.3 |

TABLE XXVI-continued

| Fraction | wt (gms) | FGM Content (wt %) (1) |
|---|---|---|
| 2 | 1.0 | 1.4 |
| 3 | 1.4 | 1.5 |
| 4 | 1.0 | 1.4 |
| 5 | 1.3 | 1.5 |
| 6 | 1.1 | 1.3 |
| 7 | 1.7 | 1.5 |
| 8 | 1.5 | 1.3 |

Note (1):
FGM content determined by refractive index, which is proportional to the actual weight percent.

The analysis of polymers in these cases A through D show that the polymers made by masking the functionality in the FGM with nonhalogenated aluminum alkyls by either of the two pathways described in this application leads to polymers which by the criteria set forth herein have a substantially uniform distribution of functionality among the polymer chains. In contrast, polymers made by masking the functionality in the FGM with any kind of halogenated aluminum alkyl (Case A in this Example) has a very nonuniform distribution with most of the functionality concentrated in a low molecular weight fraction.

EXAMPLE 21

In this example, functionalized EP polymers made by the procedures set forth in Example 11-1 were compared in chlorine content with the polymers made by the preferred embodiment of this invention, except that varying amounts of butyl perchlorocrotonate were used as a catalyst activator. Chlorine content was determined by two procedures, i.e., (i) a total chlorine content by elemental analysis, and (ii) a measure of organic chlorine by infrared spectroscopy.

Polymers suitable for chlorine determination were made by the procedures previously set forth and in accordance with the conditions of Table XXVII. The polymer analysis, is shown in Table XXVIII.

Table XXVII

Conditions

Reactor = 1.0 liter CFSTR
Temperature = 30° C.
Pressure = 500 Kpa
Agitation = 1200 rpm
Residence Time = 9 min
Al/V Molar Ratio = 10

Feeds

Hexane = 4.11 kg/hr
Ethylene 95 g/hr
Propylene = 138 g/hr
NBCA = 3 08 g/hr (as MFGM masked with TIBA, 1:1 mole ratio)
Butyl Perchlorocrotonate (BPCC) = As in Table XXVIII
$VCl_4$ = 0.493 g/hr
EADC = 3.24 g/hr

TABLE XXVIII

| Polymer | BPCC Feed (gms/hr) | Ethylene Content (wt %) | Polymerization Rate (gms/hr) |
|---|---|---|---|
| A | 0 | 54 | 162 |
| B | .802 | 52 | 169 |
| C | 1.61 | 47 | 175 |
| D | 3.21 | 43 | 187 |

The polymers in A, B, C, D made by the procedure of Table XXVII and described in Table XXVIII were analyzed for chlorine content as described below.

5.1 gms of the selected polymer was dissolved in 200 ml of hexane. The solution was filtered to remove all suspended impurities. Sufficient isopropanol to precipitate all the polymer was then slowly added with stirring to the clear filtrate. The precipitated polymer was recovered by filtration, dried and analyzed by chlorine content. Identical preparation procedures were sued for all polymers in this example. The data for polymers A, B, C, and D are shown in Table XXIX below:

TABLE XXIX

| Polymer | Chlorine (by elemental analysis) (ppm) | Absorbance at 610 cm$^{-1}$ (by infrared spectroscopy) (Note 1) |
|---|---|---|
| A | 121 | 0.03 |
| B | 162 | 0.29 |
| C | 219 | 0.73 |
| D | 421 | 0.89 |

Note (1):
Absorbance measured for a film of uniform thickness of 2/100 inch with a similar film of nonfunctionalized EP as reference.

Polymers made by the preferred embodiment of this invention were similarly analyzed for chlorine content using identical preparation procedures. The results are shown in Table XXX:

TABLE XXX

| Functionality | Polymer as in: | Chlorine by elemental analysis (ppm) | Absorbance at 610 cm$^{-1}$ by infrared spectroscopy (Note 1) |
|---|---|---|---|
| Carboxylic acid | Example 12-1 | 93 | +.02 |
| Primary Alcohol | Example 18-4 | 72 | −.01 |
| Secondary Amine | Example 19 | 101 | .03 |

Note (1):
Absorbance measured for a film of uniform thickness of 2/100 inch with similar film of nonfunctionalized EP as reference.

The results of this example indicate that polymers made by the preferred embodiment of this invention are substantially free of chlorine, particularly organic chlorine, as measured by infrared absorbance at 610 cm$^{-1}$.

From the foregoing description, one skilled in the art can easily ascertain the essential characteristics of this invention and, without departing from the spirit and scope thereof, make various changes and modifications of the invention to adapt it to various usages and conditions.

What is claimed is:

1. A method for forming a masked functionalized polymer of polymer chain monomers and functional group containing monomers comprising:
   (a) reacting at a temperature of less than 60° C. (i) functional group-containing monomers having a general formula of:

$$R_1—(X)_n$$

Wherein $R^1$ is selected from the group consisting of radicals of norbornene and homologues of norbornene having the general formula of:

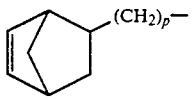

Wherein p is an integer of from one to thirty; n is an integer of at least one and X is selected from the group consisting of carboxyl, hydroxyl, cyano, thio, amino, carbonyl, imino groups with (ii) a masking agent comprising at least one non-halogenated metallic compound to form the corresponding masked functional group-containing monomers; and (b) polymerizing in the presence of a Ziegler polymerization catalyst said polymer chain monomers with said masked, functional group-containing monomers to produce a polymerization product comprising a polymer chain including masked, functional group-containing monomers.

2. The method for forming a masked functionalized polymer in accordance with claim 1, wherein said non-halogenated metallic compound is an organometallic compound of the formula:

$$M-(Y)_r$$

wherein M is a member selected from Group IB, IIA, IIB, IIIA, IVA, and the transition metals elements, Y is at least one of $R^2$, $R^3$, $R^4$ and $R^5$, wherein $R^2$-$R^5$ are independently selected from the group consisting of hydrogen and non-halogenated $C_1$-$C_{16}$ hydrocarbyl radicals, and non-halogenated $C_1$-$C_{16}$ hydrocarbyloxy radicals and r is an integer of from 1 to 4.

3. The method for forming a masked functionalized polymer in accordance with claim 2, wherein said non-halogenated $C_1$-$C_{16}$ radicals are selected from the group consisting of $C_1$-$C_{16}$ alkyl, $C_1$-$C_{16}$ aryl, and $C_1$-$C_{16}$ alkoxy.

4. The method for forming a masked functionalized polymer in accordance with claim 3, wherein $R^2$-$R^5$ are non-halogenated members independently selected from the group consisting of hydrogen, methyl, ethyl, propyl, isopropyl, butyl, isobutyl, tertiary butyl, pentyl, hexyl, phenyl, tolyl, ethylphenyl, naphthyl, methoxy, ethoxy, propoxy, hexoxy, pentoxy, phenoxy, methylphenoxy, iso-butoxy and tertiary butoxy.

5. The method for forming a masked functionalized polymer in accordance with claim 2, wherein M is an element selected from the group consisting of aluminum, magnesium, and zinc.

6. The method for forming a masked functionalized polymer in accordance with claim 5, wherein said organometallic compound is selected from the group consisting of triisobutylaluminum, triethylaluminum, diisobutyl aluminum hydride, diethylzinc, and di-n-hexylmagnesium.

7. The method for forming a masked functionalized polymer in accordance with claim 6, wherein said organometallic compound is selected from the group consisting of triisobutylaluminum, triethylaluminum, and diisobutyl aluminum hydride.

8. The method for forming a masked functionalized polymer in accordance with claim 1, wherein said polymerization catalyst comprises at least one member selected from the group consisting of vanadium compounds, titanium compounds and zirconium compounds.

9. The method for forming a masked functionalized polymer in accordance with claim 8, wherein said vanadium compounds include a member selected from the group consisting of vanadium halides, vanadium oxyhalide and vanadium salts of beta-diketonates.

10. The method for forming a masked functionalized polymer in accordance with claim 9, wherein said vanadium halide is vanadium tetrachloride.

11. The method for forming a masked functionalized polymer in accordance with claim 8, wherein said titanium compounds are selected from the group consisting of $TiCl_3$, $TiCl_4$, and $TiCl_3.\frac{1}{3} AlCl_3$.

12. The method for forming a masked functionalized polymer in accordance with claim 11, wherein said titanium compounds are electron donor modified versions of $TiCl_4$, $TiCl_3$ and $TiCl_3.\frac{1}{3} AlCl_3$.

13. The method for forming a masked functionalized polymer in accordance with claim 8, wherein said polymerization catalyst further comprises an organoaluminum co-catalyst having the formula $R_xAlX_{(3-x)}$ wherein X is a halogen, R is a member selected from the group consisting of alkyl and aryl, and x is greater than 0 up to 3.

14. The method for forming a masked functionalized polymer in accordance with claim 13, wherein R of said organoaluminum co-catalyst is a member selected from the group consisting of $C_1$-$C_{16}$ alkyl and phenyl.

15. The method for forming a masked functionalized polymer in accordance with claim 14, wherein said organoaluminum co-catalyst is a member selected from the group consisting of ethyl aluminum dichloride, diethyl aluminum chloride, and ethyl aluminum sesquichloride.

16. The method for forming a masked functionalized polymer in accordance with claim 14, wherein x of said organoaluminum co-catalyst is greater than 0 up to 2.

17. The method for forming a masked functionalized polymer in accordance with claim 14, wherein said at least one vanadium compound and said organoaluminum co-catalyst are present in said catalyst in a molar ratio of vanadium to aluminum of about 1:2 to 1:30.

18. The method for forming a masked functionalized polymer in accordance with claim 1, wherein said polymer chain monomers are members selected form the group consisting of ethylene, $C_3$-$C_{25}$ alpha olefins and nonconjugated dienes.

19. The method for forming a masked functionalized polymer in accordance with claim 18, wherein said alphaolefins are selected from the group consisting of propylene, 1-butene, 1-pentene, 1-hexene, 1-octene and 1-dodecene.

20. The method for forming a masked functionalized polymer in accordance with claim 18, wherein in said nonconjugated diene is selected from the group of straight chain, branched chain and cyclic hydrocarbon diolefins having 6 to 15 carbons.

21. The method for forming a masked functionalized polymer in accordance with claim 18, wherein said nonconjugated dienes are selected from the group consisting of dicyclopentadiene, 1,4-hexadiene, 5-methylene-2-norbornene and 5-ethylidene-2-norbornene.

22. The method for forming a masked functionalized polymer in accordance with claim 21, wherein said nonconjugated dienes are selected from the group consisting of 5-ethylidene-2-norbornene, and 1,4-hexadiene.

23. The method for forming a masked functionalized polymer in accordance with claim 18, wherein said polymer chain monomers are a mixture consisting essentially of ethylene and propylene.

24. A method for forming a functionalized polymer of polymer chain monomers and functional group-containing monomers comprising:
(a) reacting at a temperature of less than 60° C. (i) functional group-containing monomers having the general formula:

Wherein $R^1$ is selected from the group consisting of norbornene and homologues of radicals of norbornene having the general formula of:

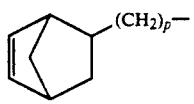

Wherein p is an integer of from one to thirty; n is an integer of at least one, and X is selected from the group consisting of carboxyl, hydroxyl, cyano, thio, amino, carbonyl, and imino groups with (ii) a masking agent comprising at least one nonhalogenated metallic compound to form the corresponding masked, functional group-containing monomer;
(b) polymerizing in the presence of a Ziegler polymerization catalyst said polymer chain monomers with said masked functional group-containing monomers to produce a polymerization product comprising a polymer chain including masked functional group-containing monomers; and
(c) contacting said polymer chain with an aqueous liquid in a de-ashing step to regenerate said masked functional group-containing monomers into functional group-containing monomers with said polymer chain.

25. The method in accordance with claim 24, wherein said reacting is performed at a temperature of less than +30° C.

26. The method in accordance with claim 25, further comprising maintaining said masked, functional group-containing monomers at a temperature of less than +30° C. prior to said polymerizing.

27. The method in accordance with claim 1, wherein said functional group-containing monomers include at least two different functional group-containing monomers wherein X of each different functional group-containing monomers is independently selected from said group consisting of carboxyl, hydroxyl, cyano, amino, carbon imino groups.

28. The method according to claim 27 wherein said masked functionalized polymer chain contains functional group-containing monomers, said functional groups being at least two of the group consisting of carboxyl, hydroxyl, cyano, amino, carbonyl and imino groups.

29. The method in accordance with claim 28, wherein said at least two different functional group-containing monomers include functional group-containing monomers wherein X is independently selected from the group consisting of carboxyl groups and hydroxyl groups, and wherein said masked functionalized polymer chain contains multiple functionality provided by carboxylic acid residues and alcohol residues on said polymer chain.

30. The method according to claim 23 wherein said polymerization product comprises said masked-functional group-containing polymer, polymerization catalyst, and unreacted functional group-containing monomers, and said de-ashing involves contacting said polymerization product with a liquid selected from the group consisting of water, aqueous mineral acid solutions, and aqueous mineral base solutions.

31. The method in accordance with claim 30, wherein said liquid comprises an aqueous solution of at least one mineral acid selected from the group consisting of HCl, HBr, $HNO_3$, $H_2SO_4$, $H_3PO_4$.

32. The method in accordance with claim 31, wherein said de-ashing involves contacting said polymerization product with at least 0.3 volumes of said liquid per volume of said polymerization product.

33. The method in accordance with claim 32, wherein said contacting is conducted for a time period within the range of about 3 to 30 minutes and at a temperature of at least 0° C. up to about 150° C.

* * * * *